(12) United States Patent
Sayama

(10) Patent No.: US 8,141,930 B2
(45) Date of Patent: Mar. 27, 2012

(54) VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 171 days.

(21) Appl. No.: 12/682,074

(22) PCT Filed: Oct. 9, 2008

(86) PCT No.: PCT/JP2008/068388
§ 371 (c)(1),
(2), (4) Date: Apr. 8, 2010

(87) PCT Pub. No.: WO2009/048110
PCT Pub. Date: Apr. 16, 2009

(65) Prior Publication Data
US 2010/0207418 A1    Aug. 19, 2010

(30) Foreign Application Priority Data
Oct. 9, 2007    (JP) ................................. 2007-263229

(51) Int. Cl.
*B60N 2/30* (2006.01)
(52) U.S. Cl. .................. 296/65.09; 297/15; 297/378.12; 297/335
(58) Field of Classification Search ............... 296/65.05, 296/65.09, 65.16; 297/15, 331, 335, 344.25, 297/378.1, 378.12
See application file for complete search history.

(56) References Cited

U.S. PATENT DOCUMENTS

| | | | |
|---|---|---|---|
| 5,056,849 A | 10/1991 | Norris, Jr. et al. | |
| 5,641,202 A * | 6/1997 | Rus | 297/335 |
| 6,231,101 B1 * | 5/2001 | Kamida et al. | 296/63 |
| 6,837,530 B2 * | 1/2005 | Rudberg et al. | 296/65.09 |
| 7,156,442 B2 | 1/2007 | McManus et al. | |
| 7,201,425 B2 * | 4/2007 | Tsujibayashi et al. | 296/65.09 |
| 7,252,320 B2 * | 8/2007 | Tsujibayashi et al. | 296/65.09 |
| 8,052,194 B2 * | 11/2011 | Sayama | 296/65.09 |
| 2001/0026075 A1 * | 10/2001 | Shimizu et al. | 296/65.05 |
| 2003/0094830 A1 * | 5/2003 | Kamida et al. | 296/65.09 |
| 2004/0100115 A1 * | 5/2004 | Rhodes et al. | 296/65.09 |
| 2007/0029832 A1 * | 2/2007 | Prugarewicz | 296/65.09 |

FOREIGN PATENT DOCUMENTS

| | | |
|---|---|---|
| EP | 1 568 536 A2 | 8/2005 |
| JP | S56-21611 B2 | 5/1981 |
| JP | H07-172223 A | 7/1995 |
| JP | 2514957 Y2 | 8/1996 |
| JP | 2854253 B2 | 2/1999 |
| JP | 2996885 B2 | 1/2000 |
| JP | 2005-225376 A | 8/2005 |
| JP | 2005-239050 A | 9/2005 |
| JP | 2006-082698 A | 3/2006 |

* cited by examiner

*Primary Examiner* — Dennis Pedder
*Assistant Examiner* — Jason S Daniels
(74) *Attorney, Agent, or Firm* — Drinker Biddle & Reath LLP

(57) ABSTRACT

There is provided a vehicle seat having an increased number of kinds of seat arrangements. A vehicle seat includes a seat support part for rotatably supporting the rear side of a seat cushion, a seat back that is foldable over the seat cushion via a reclining mechanism, a stowage recess provided on the vehicle body floor side, a front leg provided in the front part of the seat cushion, a leg locking mechanism that engages and disengages the front leg with and from the vehicle body floor side, a link mechanism connected to both the reclining mechanism and the leg locking mechanism, and a strap that operates the reclining mechanism and the leg locking mechanism via the link mechanism, and further includes a seat arrangement selective mechanism for enabling or disabling the operation of the reclining mechanism.

5 Claims, 23 Drawing Sheets

VEHICLE SEAT

CROSS-REFERENCE TO RELATED APPLICATIONS

This application is the U.S. national phase of the International Patent Application No. PCT/JP2008/068388 filed Oct. 9, 2008, which claims the benefit of Japanese Patent Application No. 2007-263229 filed Oct. 9, 2007, the entire content of which is incorporated herein by reference.

BACKGROUND

Various embodiments of the present invention relate to a vehicle seat and, more particularly, to a vehicle seat having an increased number of kinds of seat arrangements.

Conventionally, there has been known a vehicle seat in which—in the state in which the rear end part of a seat cushion constituting a vehicle seat is supported to be rotatable in the front and rear direction on the front side of a stowage recess (storage recess) in vehicle body floor, and a seat back is folded over the seat cushion—the vehicle seat can be rotated to the rear and stowed in the stowage recess.

For example, as disclosed in Japanese Unexamined Patent Application Publication No. 2006-82698 ("the '698 Publication"), there are provided rotating shafts provided in both right and left side edge parts in the front part of the stowage recess and brackets provided in right and left parts of the rear end part of the seat cushion, and the brackets are disposed to be rotatable in the front and rear direction with respect to the rotating shafts, whereby the seat can be stowed in the stowage recess by supporting the rear end part of the seat cushion to be rotatable in the front and rear direction.

In the technique described in the '698 Publication, the configuration is made such that although the vehicle seat can be made in seat arrangements of setting state and stowage state, other seat arrangements cannot be provided.

If the seat is rotated to the rear, and the seat cushion and the seat back in an ordinary setting state are used as the seat back and the seat cushion, respectively, a seat arrangement in which the seat can be used as a rearward seat can be provided. This seat arrangement is a seat arrangement known as a so-called "open bench".

SUMMARY

An object various embodiments of the present invention is to provide a vehicle seat that provides a seat arrangement as an "open bench".

To achieve the above object, a vehicle seat is provided having two patterns of a fall-down state and an open bench state as a seat arrangement and includes a first seat support for rotatably supporting one end part side of a seat cushion; a seat back that is foldable over the seat cushion via a reclining assembly; a second seat support provided on an other end part side of the seat cushion; an engaging and disengaging assembly that engages and disengages the second seat support with and from the vehicle body floor side; a link mechanism connected to the reclining assembly and the engaging and disengaging assembly; and an operating element that operates at least one of the reclining assembly and the engaging and disengaging assembly via the link mechanism, and includes a selective assembly for enabling and disabling the operation of the reclining assembly.

Thus, the seat has two patterns of the fall-down state and the open bench state as a seat arrangement, and includes the first seat support for rotatably supporting one end part side of the seat cushion, the seat back being foldable over the seat cushion via the reclining assembly, a stowage area provided on the vehicle floor side, the second seat support provided on the other end part side of the seat cushion, the engaging and disengaging assembly that engages and disengages the second seat support with and from the vehicle body floor side, the link mechanism connected to at least the reclining assembly, and the operating element that operates at least one of the reclining assembly and the engaging and disengaging assembly via the link mechanism. The seat further includes the selective assembly for enabling or disabling the operation of the reclining assembly. Therefore, in the state in which the locking releasing operation for the reclining assembly is enabled by the operation of the selective assembly, the seat can be arranged in the stowage/restoration state, and in the state of being disabled, the seat can be arranged in the open bench state.

It is preferable that the selective assembly include a rotating member, one end part side of which is rotatably supported and to the other end part side of which is fixed a guide bracket for guiding a transmitting member connected to the link mechanism and the reclining assembly, a plate material formed with substantially rectangular recess, and a selective member that operates the plate material; the rotating member have a protrusion on the plate material side; and the protrusion be fitted to be movable in the recess.

Thus, the selective assembly is configured so that the protrusion is formed on the rotating member one end part side of which is rotatably supported and to the other end part side of which is fixed the guide bracket, the recess formed in the plate material operated by the selective member is provided, and the protrusion is fitted to be movable in the recess. Therefore, the arrangement of the recess is changed by the rotation position of the selective member, and when the recess is arranged on the lower side of the plate material, the rotating member rotates downward because the protrusion can move downward, and the locking releasing operation for the reclining assembly can be disabled by disposing the guide bracket on the lower side. On the other hand, when the recess is arranged on the upper side of the plate material, the rotating member cannot rotate downward because the protrusion is locked to the lower edge side of the recess, and the locking releasing operation for the reclining assembly can be enabled because the guide bracket is not moved. Therefore, the change of seat arrangement to the stowage state or the open bench state can be selected by the operation of the selective member.

More specifically, it is preferable that the selective assembly include a rotating member, one end part side of which is rotatably supported and to the other end part side of which is fixed a guide bracket for guiding a transmitting member connected to the link mechanism and the reclining assembly, a selective member that operates the rotating member, and an urging element for urging the rotating member to the base plate side on which the rotating member is supported.

At this time, it is further preferable that a protrusion be provided on the rotating member side of the base plate or on the base plate side of the rotating member.

Thus, the selective assembly includes the rotating member, one end part side of which is rotatably supported and to the other end part side of which is fixed a guide bracket for guiding a transmitting member connected to the link mechanism and the reclining assembly, and the urging element for urging the rotating member to the base plate side on which the rotating member is supported. Therefore, the rotating member can be stopped in any position by being pressed against the protrusion on the base plate side or the rotating member side by the urging force, so that the locking releasing operation for the reclining assembly can be disabled by rotating the rotating member downward and by disposing the guide bracket on the lower side. On the other hand, the locking releasing operation for the reclining assembly can be enabled by rotating the rotating member upward and by disposing the guide bracket on the upper side. Therefore, the change of seat arrangement to the stowage state or the open bench state can be selected by the operation of the selective member.

Further specifically, it is preferable that the link mechanism include a link member that is rotated by the pulling of the operating element and is disposed in a position of being not in contact with the rotating member; the selective assembly includes a rotating member, one end part side of which is rotatably supported and to which is locked a transmitting member connected to the reclining assembly, a plate material formed with an elongated hole, and a selective member that operates the plate material; and the selective assembly further have a projecting member that is fitted to be movable in the elongated hole, and comes into contact with both of the link member and the rotating member.

Thus, the selective assembly includes the rotatable rotating member to which a transmitting member connected to the reclining assembly is locked, the plate material formed with the elongated hole, and the selective member operates the plate material, and the projecting member comes into contact with both of the link member and the rotating member is fitted in the elongated hole to be movable. Therefore, the arrangement of the projecting member fitted in the elongated hole in the plate material can be operated by the operation of the selective member. When the projecting member is arranged between the link member and the rotating member, the rotating of the link member is transmitted to the rotating member via the projecting member, and the rotating member also rotates, so that the transmitting member of the reclining assembly locked to the rotating member can be pulled, whereby the locking releasing operation for the reclining assembly can be enabled. When the projecting member is arranged in a position of not being moved by the link member, the rotating of the link member is not transmitted to the rotating member, and the rotating member does not rotate, so that the transmitting member of the reclining assembly locked to the rotating member cannot be pulled, whereby the locking releasing operation for the reclining assembly can be disabled. The enabling and disabling of the locking releasing operation can be selected by the operation of the selective member, so that the change of seat arrangement to the stowage state or the open bench state can be selected by the operation of the selective member.

According to the vehicle seat in accordance with various embodiments of the present invention, in addition to the conventional stowage/restoration state as the seat arrangement, the seat can be arranged in the open bench state. The addition of seat arrangement can improve the commodity quality.

Also, by the operation of the selective member, the change of seat arrangement to either of the stowage state and the open bench state can be selected. That is to say, by selecting the seat arrangement by way of the selective member in the state in which the seat is set, the seat can be arranged in either the stowage state or the open bench state by the pulling operation of a strap, so that high operability can be assured.

BRIEF DESCRIPTION OF THE DRAWINGS

Various embodiments of the invention are illustrated in the drawings and described in more detail below.

DETAILED DESCRIPTION OF THE EMBODIMENTS

Embodiments of the present invention will now be described with reference to the accompanying drawings. Needless to say, the members, arrangements, and the like described below do not restrict the present invention, and can be modified and changed variously in light of the teachings of the present invention.

First Embodiment

FIGS. 1 to 17 show a first embodiment of the present invention. First, the configuration of a seat S, S1 in accordance with this embodiment is explained with reference to FIGS. 1 to 4.

A vehicle equipped with the seat S of this embodiment has three-row seats arranged in the front and rear direction, and the seat of the third row is configured to be stowable. The seat S in accordance with this embodiment relates to the third-row seat. At the rear of the seat S, a stowage recess 5 serving as a stowage area for stowing the seat S is provided in a vehicle body floor 4. On this vehicle, a floor carpet (not shown) is laid throughout almost the entire surface of the vehicle floor 4.

The seat S has three seats in the right and left direction, and is configured by a right seat S1 for two persons, which is located on the right-hand side with respect to the vehicle travel direction, and a left seat S2 for one person.

In the description below, the right-hand side and the left-hand side showing the direction are referred to with respect to the vehicle travel direction.

Also, since the stowage mechanisms and operating methods of the right seat S1 and the left seat S2 are the same, in the explanation below, for convenience, explanation is given by taking the right seat S1 as the seat S.

Figure 1:
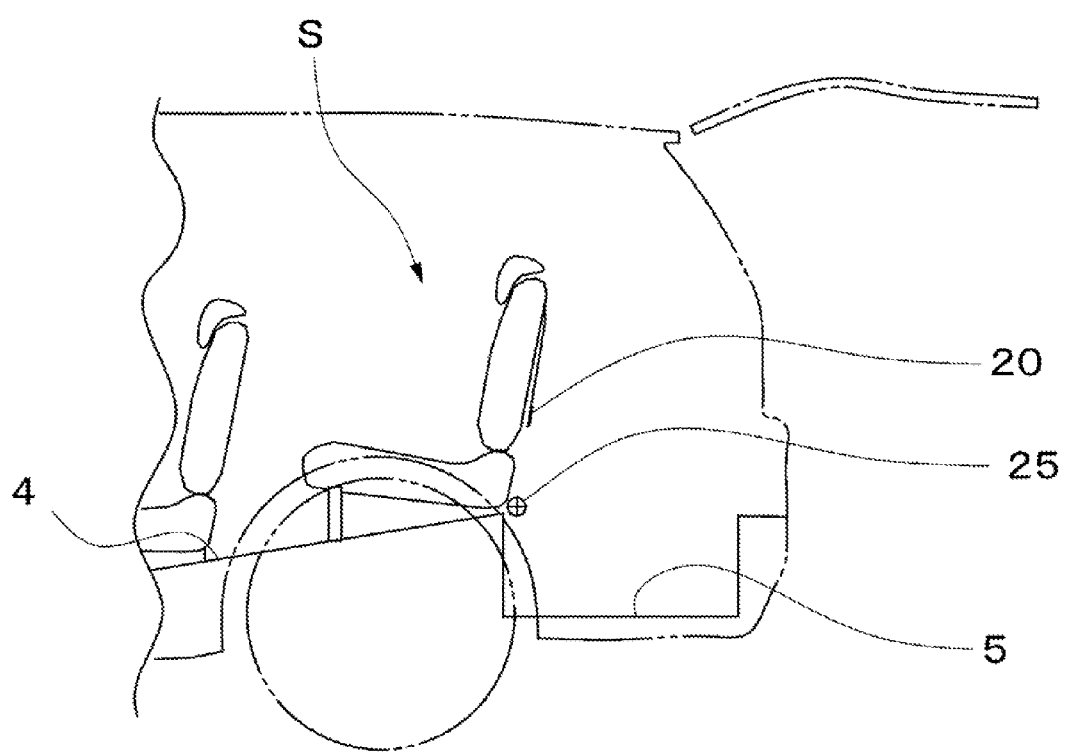
FIG. 1 is a schematic side view of a vehicle rear part equipped with a vehicle seat in accordance with a first embodiment of the present invention.
Figure 2:
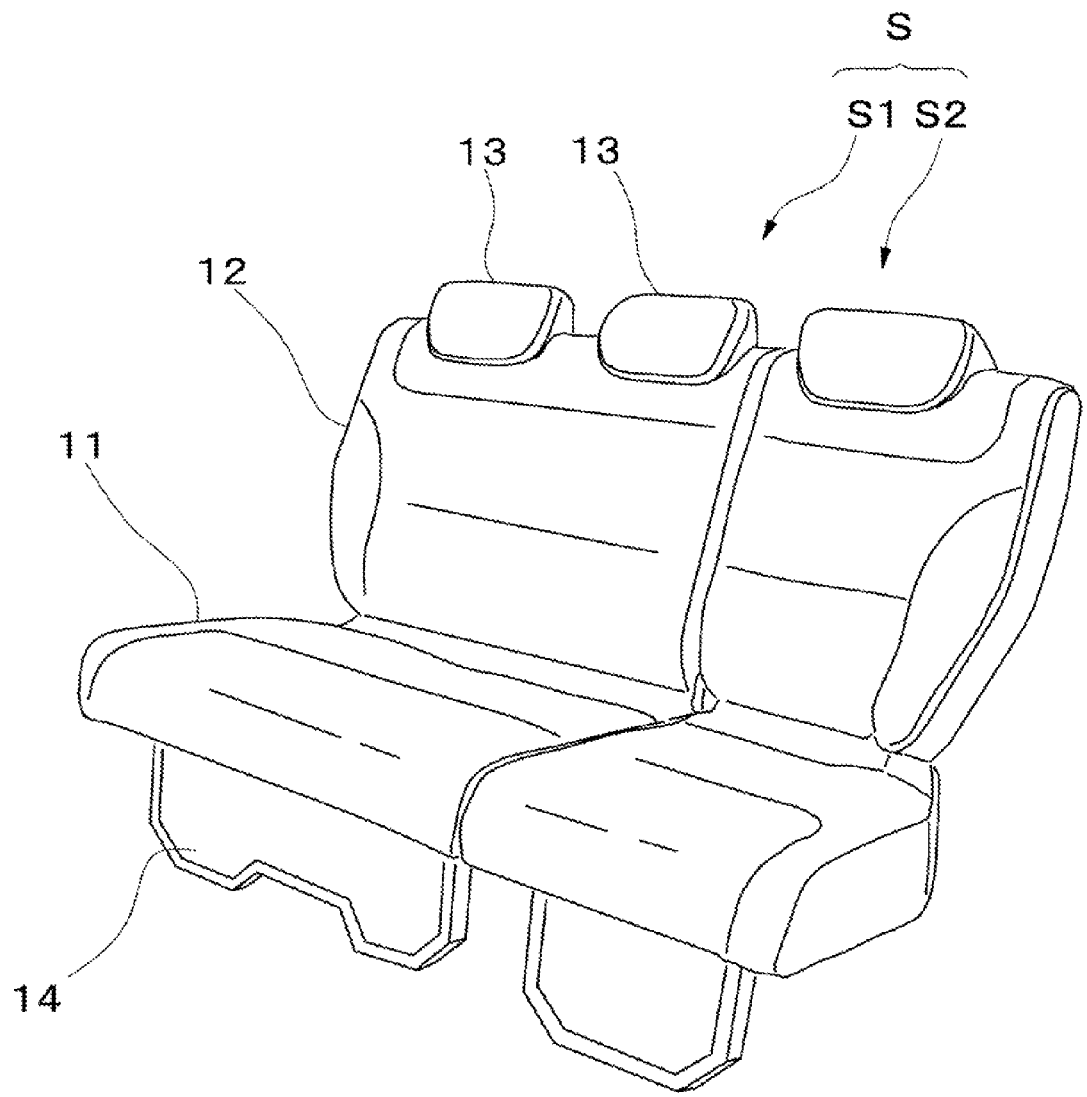
FIG. 2 is a front perspective view of a vehicle seat in accordance with a first embodiment of the present invention.
Figure 3:
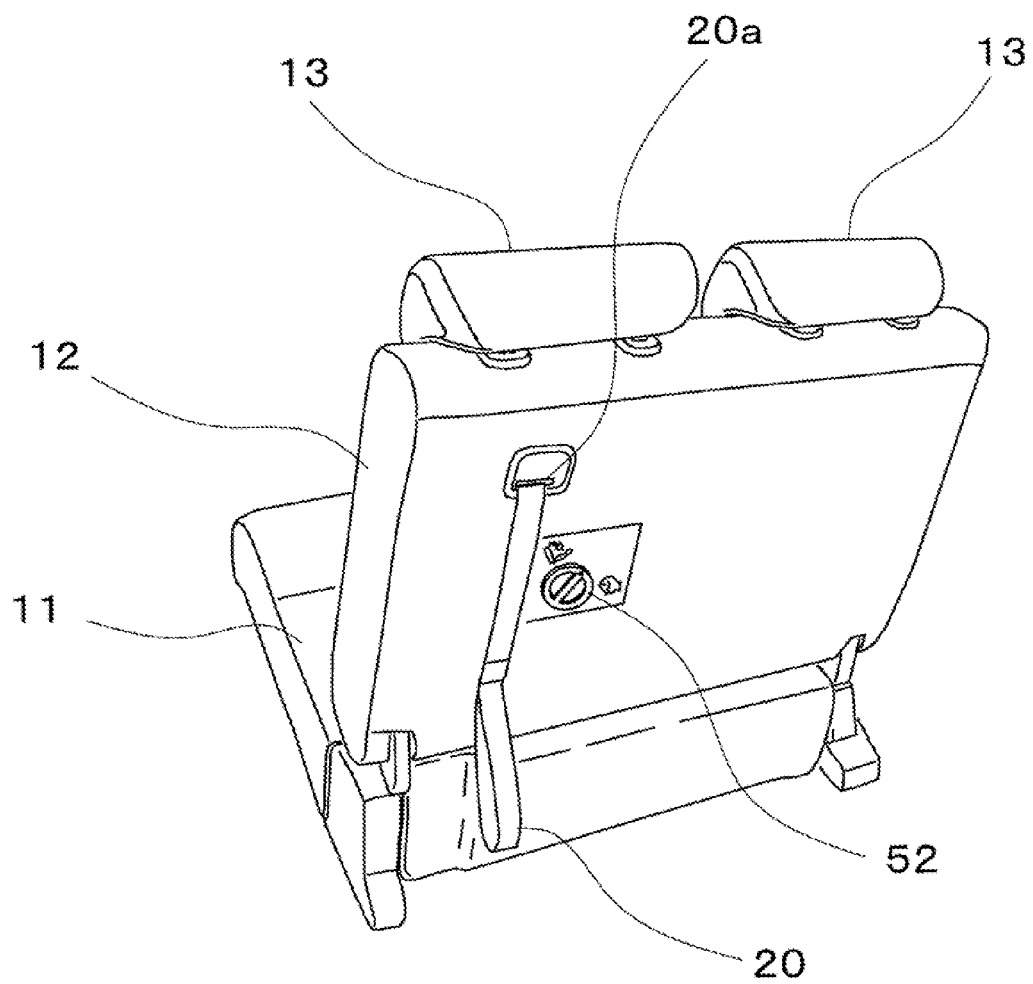
FIG. 3 is a rear perspective view of a vehicle seat in accordance with a first embodiment of the present invention.

The seat S is made up of a seat cushion 11, a seat back 12, headrests 13, 13 and a front leg 14. Also, as shown in FIG. 3, from the back side of the seat back 12, a strap 20 serving as a single operating element for performing the stowing/restoring operation of the seat S is extended from the back surface side of the seat S to the outside.

Also, a selective dial 52 serving as a selective member for making seat arrangement selection to a setting that provides an open bench arrangement (open bench mode) or a setting for performing stowage (stowage mode) is disposed on the back surface of the seat back 12.

The open bench means a seat that is set to be directed to the opened rear door side. In this embodiment, the seat back 12 in a state of being raised with respect to the seat cushion 11 is rotated rearward and is kept in a state of being brought into contact with the vehicle body floor 4 (the edge part of the stowage recess 5), and on the other hand, the seat back 12 is used as a seat cushion and the seat cushion 11 is used as a seat back, whereby the seat S can be directed to the rear door side.

The strap 20 is an operating element operated at the time of stowing/restoring operation of the seat S, and is configured so that a flexible wide belt having a length of about 1 m is extended from a strap outlet part 20a to the other side to facilitate operation performed by a passenger. The stowing/restoring operation of the seat S can be performed by the pulling operation of the strap 20, so that the operation load can be reduced as compared with the operation using a lever. In the state in which the stowing/restoring operation of the seat S is not performed, a part of the strap 20 is hooked to a planar fastener on the back surface of the seat back 12. In this embodiment, the strap 20 serving as the operating element is configured to be of a belt form. However, the strap 20 may be formed in a string form or a pulling lever form.

The selective dial 52, which is a selective assembly for making seat arrangement selection, can make selection between a locking releasing enable state of a reclining mechanism 27 and a locking releasing disable state thereof when the strap 20 is pulled to the rear from the setting state of the seat S.

Thereby, in the locking releasing enable state of the reclining mechanism 27, a state in which the seat S can be stowed is formed, and on the other hand, in the locking releasing disable state, a state in which the seat arrangement can be made a bench seat is formed.

In this embodiment, the selective dial 52 is configured to be of a dial form. However, the selective dial 52 may be formed in a lever form, a belt form, or a pushbutton form.

Figure 4:
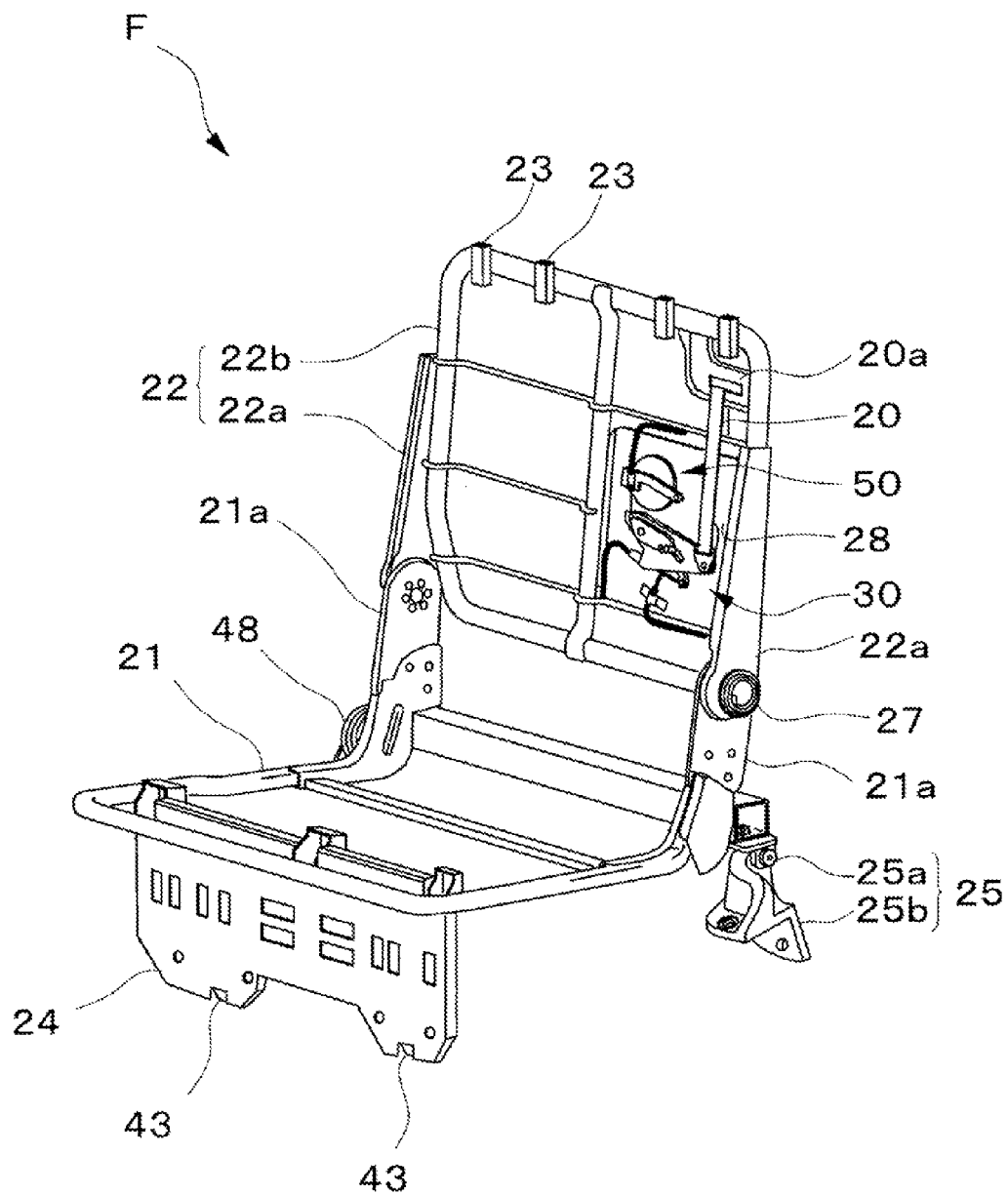
FIG. 4 is a schematic perspective view of a seat frame in accordance with a first embodiment of the present invention.
Figure 5:
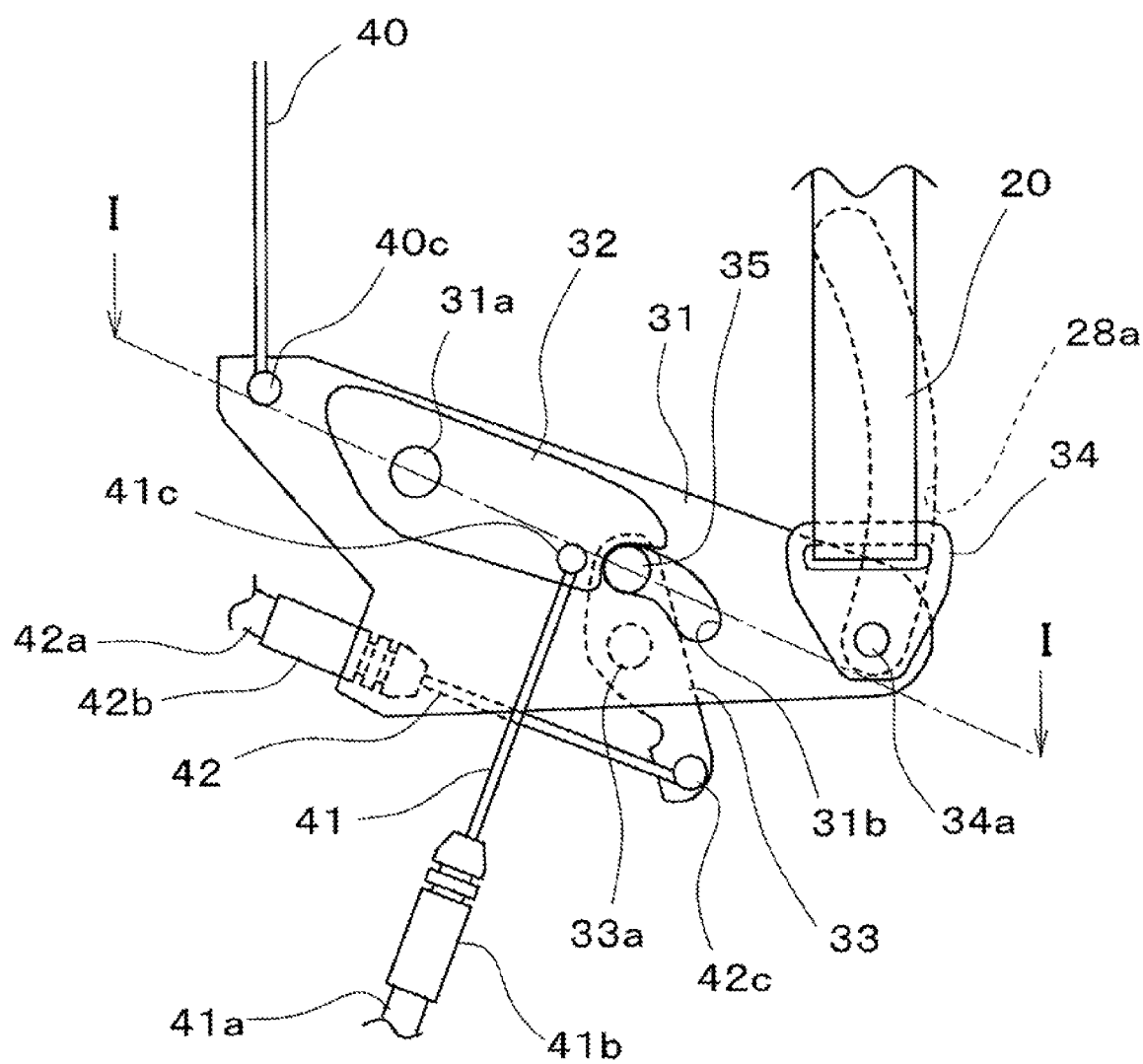
FIG. 5 is an enlarged explanatory side view of a link mechanism in accordance with a first embodiment of the present invention.
Figure 6:
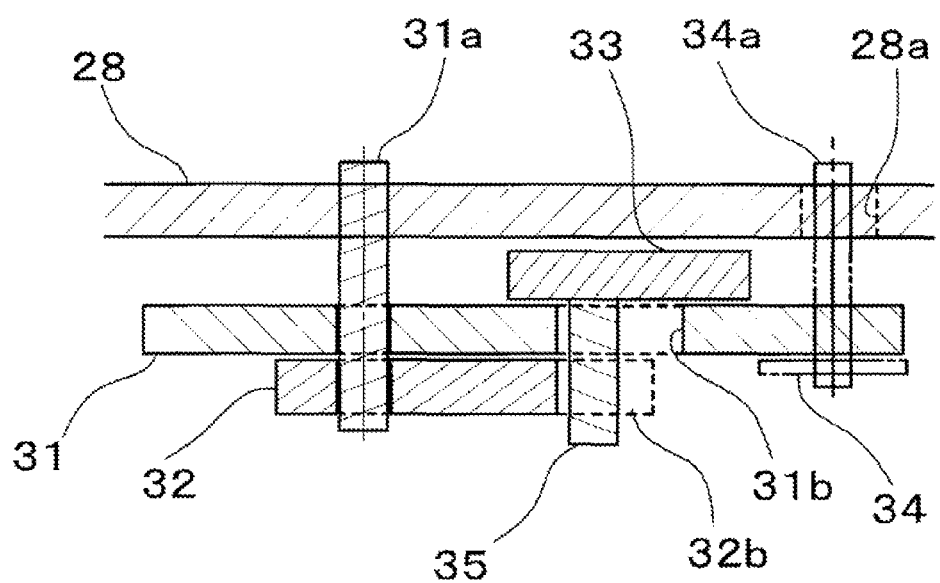
FIG. 6 is a sectional explanatory view of a link mechanism in accordance with a first embodiment of the present invention, the view being taken along the line I-I of FIG. 5.
Figure 7:
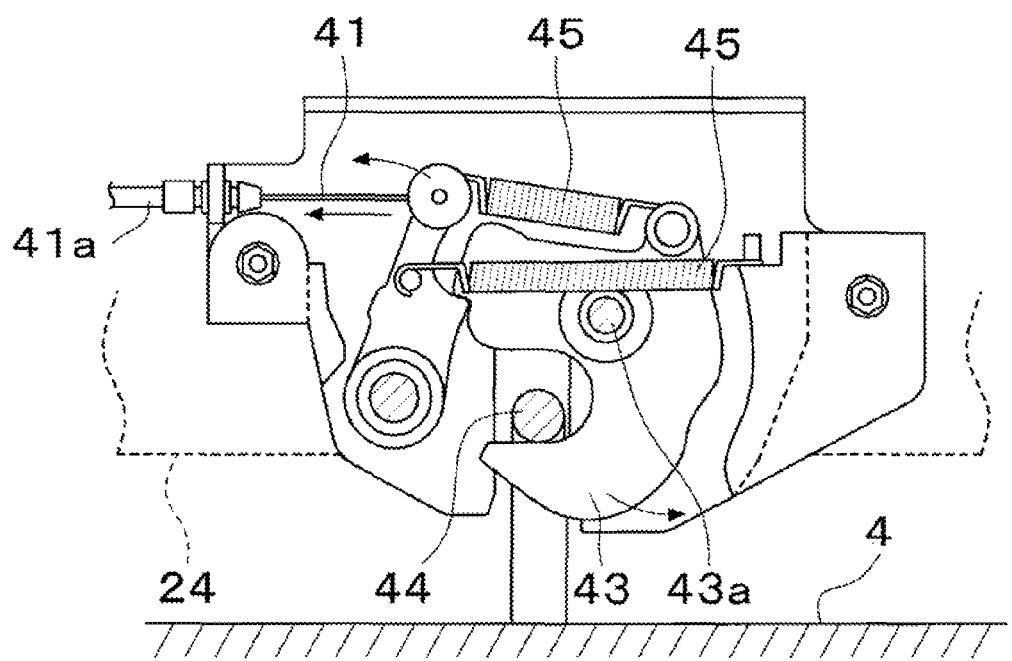
FIG. 7 is a schematic explanatory side view of a locking part of a front leg in accordance with a first embodiment of the present invention.

A seat frame F of the seat S shown in FIG. 4 includes a seat cushion frame 21 constituting the seat cushion 11, a seat back frame 22 constituting the seat back 12, and a front leg frame 24. Also, in the upper part of the seat back frame 22, pillars for headrest frames (not shown) are disposed via pillar support parts 23.

The seat cushion frame 21 is used to constitute the seat cushion 11 that is covered by a cushion pad, a cover, or the like (not shown) and supports the passenger from the lower side. The front side of the seat cushion frame 21 is supported on the vehicle body floor 4 side by the front leg frame 24. The rear end part side of the seat cushion frame 21 is supported on seat support parts 25 serving as first seat support rotatable in the front and rear direction with respect to rotating shaft brackets 25b fixed to the vehicle body floor 4 side via a rotating shaft 25a. To the seat support part 25, a spiral spring 48 is mounted to urge the seat cushion 11 to the forward rotating direction and to buffer the shock at the stowage time.

Also, in the rear end part of the seat cushion frame 21, back frame support parts 21a, 21a are provided.

The seat back frame 22 is used to constitute the seat back 12 that is covered by a cushion pad or the like (not shown) and supports the passenger's back from the rear, and in this embodiment, comprises a substantially rectangular frame body. More specifically, the seat back frame 22 is formed by two side frames 22a, 22a which are disposed to be separate in the right and left direction and extend in the up and down direction, and a central frame 22b, which is the substantially rectangular frame body held between the side frames 22a, 22a.

The lower end part side of the side frames 22a, 22a is connected to the back frame support part 21a, 21a via a reclining mechanism 27 serving as a reclining assembly.

On the inside of the central frame 22b, which is the frame body, a substantially plate-shaped back plate 28 serving as a base plate is disposed along the plane for supporting the passenger's back. On the back plate 28, a link mechanism 30 and a seat arrangement selective mechanism 50, both of them being described below, are provided. Also, the strap outlet part 20a is provided in the upper part of the central frame 22b.

The front leg frame 24 is used to constitute the front leg 14 that is covered by a cover material (not shown) and serves as a second seat support, and is connected to the vehicle body floor 4 side to support the front side of the seat cushion frame 21. The front leg frame 24 is supported, in the upper part thereof, on the front side of the seat cushion frame 21 to be rotatable in the front and rear direction, and in the lower part of the front leg frame 24, locking claws 43, 43 that are connected to a leg striker 44 provided on the vehicle body floor 4 side to be engageable and disengageable are provided at two places. In this embodiment, the configuration is made such that the locking claws 43 are provided at two places at the right and left. However, the configuration may be made such that either one of the right and left locking claws 43 is provided, or one locking claw 43 is provided at one place in the central portion.

Next, the configuration of the link mechanism 30 is explained with reference to FIGS. 5 to 9.

The link mechanism 30 is connected to the strap 20 operated at the time of stowage and restoration of the seat S, and has a function of appropriately releasing the rotating of the reclining mechanism 27 and the locked state of the front leg 14 to the vehicle body floor 4 in association with the operation of the strap 20 and the state of the seat S. As described above, the link mechanism 30 is formed on the back plate 28.

The link mechanism 30 is configured to have a first link member 31, a second link member 32, and a third link member 33, which are rotatably supported, and a power transmitting member is connected to each of the link members. These link members are configured to be operated in association with each other according to the state between the power transmitting members and the operation between the link members.

As the power transmitting members, there are provided a reclining releasing wire 40 connected to the reclining mechanism 27 via the seat arrangement selective mechanism 50 serving as a selective assembly, the strap 20 serving as the operating element, a leg releasing wire 41 connected to the locking claw 43 of the front leg 14, and a cancel wire 42 for detecting the fall-down state (folded state) of the seat back 12.

The first link member 31 is a substantially inverse triangular member that is flat in the right and left direction. To a locking part 40c provided on one end part side of the first link member 31, the reclining releasing wire 40 serving as the power transmitting member is locked, and to a locking part 34a provided on the other side of the first link member 31, the strap 20 is locked via a strap connecting member 34, so that the first link member 31 is rotatably supported on the back plate 28 by a first shaft part 31a provided between the locking parts 40c and 34a.

Also, between the first shaft part 31a and the locking part 34a, an arc-shaped elongated hole 31b is formed to draw a circle concentric with a second shaft part 33a, described below.

The other end part sides of the reclining releasing wire 40 locked to the first link member 31 as the power transmitting member and the strap 20 are explained below.

Figure 8:
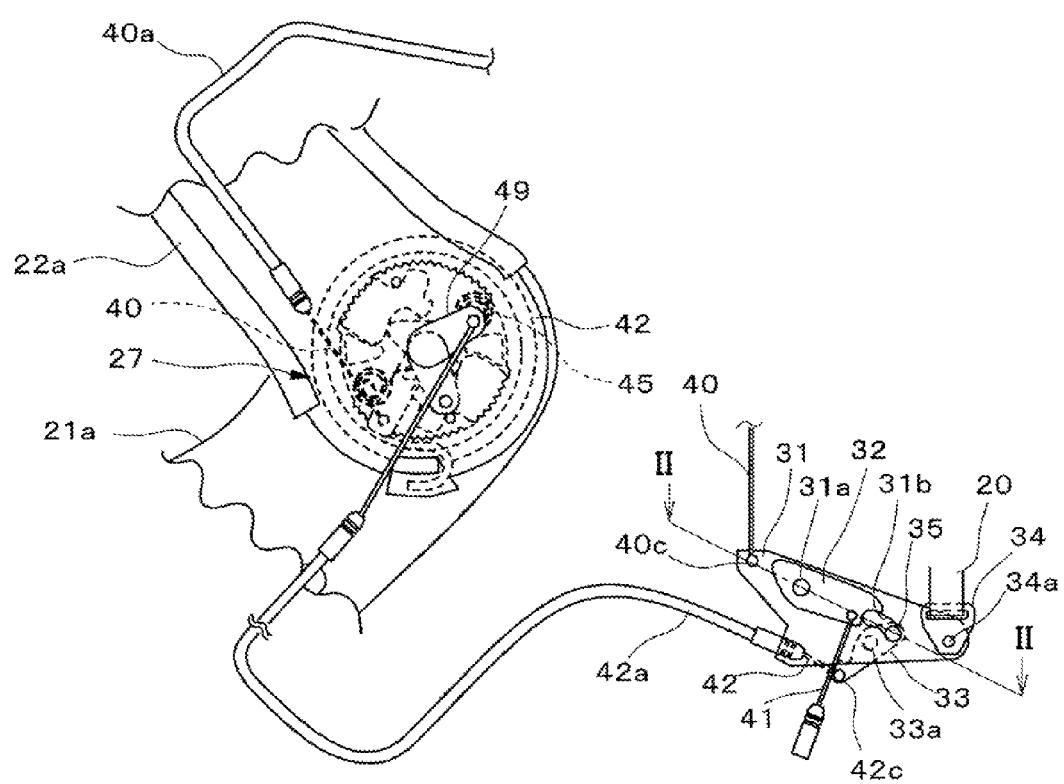
FIG. 8 is an enlarged explanatory side view of a link mechanism at the time of folding of a seat back in accordance with a first embodiment of the present invention.
Figure 9:
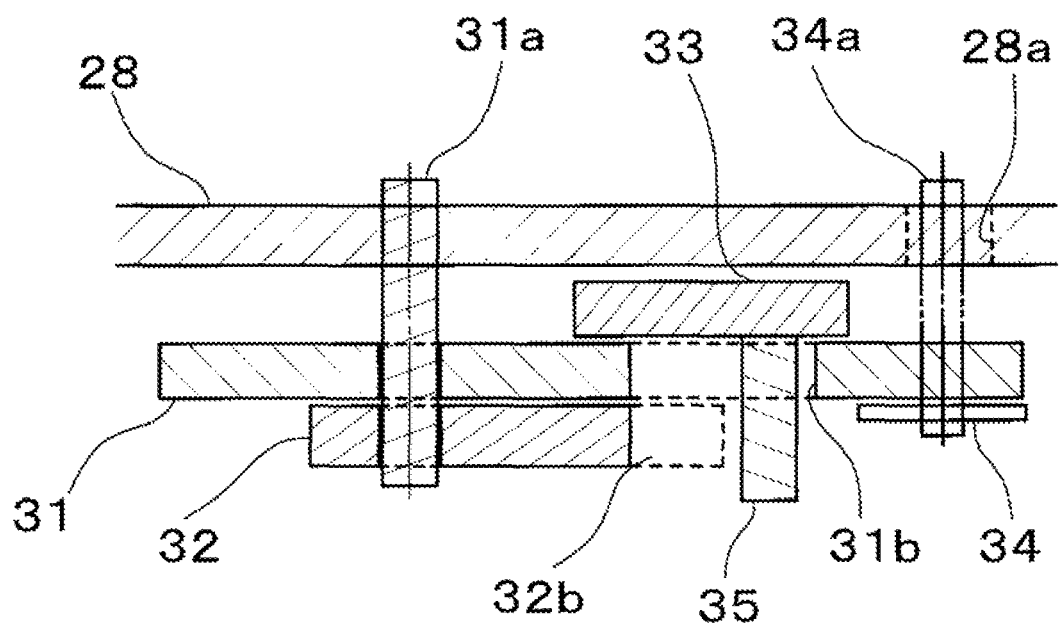
FIG. 9 is a sectional explanatory view of a link mechanism in accordance with a first embodiment of the present invention, the view being taken along the line II-II of FIG. 8.

As shown in FIG. 8, the other end part side of the reclining releasing wire 40 locked to the locking part 40c of the first link member 31 is guided by a reclining releasing cable 40a via the seat arrangement selective mechanism 50 and is connected to the reclining mechanism 27 serving as the reclining assembly that releases the locked state of rotating of the seat back 12.

The seat arrangement selective mechanism 50 is described below.

The reclining mechanism 27 is a mechanism for releasing the locked state of rotating of the reclining mechanism 27 to make the seat back 12 in a rotatable state when the reclining releasing wire 40 is pulled to the link mechanism 30 side by the operation of the link mechanism 30. The other end part side of the strap 20 connected to the end part side of the first link member 31 via the strap connecting member 34 is extended from the strap outlet part 20a provided on the back surface of the seat back 12 to the outside of the seat back 12 to make the operation performed by the passenger easy. In association with the operation of the strap 20 performed by the passenger, the power (the operating force of the passenger) can be transmitted to the first link member 31.

That is to say, when the strap 20 is operated, the first link member 31 is rotated, and the locking of the reclining mechanism 27 is released.

The second link member 32 is a substantially rectangular member, and is disposed on the first link member 31.

The end part side on which the reclining releasing wire 40 is mounted is pivotally supported to be rotatable coaxially with the first link member 31 by the first shaft part 31a. On the other end part side, a locking recess 32b that is in contact with a locking protrusion 35, described below, is formed. Between the first shaft part 31a and the locking recess 32b, a locking part 41c to which the leg releasing wire 41 is locked is formed.

The other end part side of the leg releasing wire 41 locked to the second link member 32 as the power transmitting member is explained below.

The other end part side of the leg releasing wire 41 locked to the locking part 41c of the second link member 32 is guided by a leg releasing cable 41a and is connected to a leg locking releasing mechanism serving as an engaging and disengaging assembly. The leg locking releasing mechanism is formed in the front leg frame 24, and releases the locking to the leg striker 44 on the vehicle body floor 4 side by turning the locking claws 43 connected to the leg releasing wire 41 around a locking claw rotating shaft 43a when the leg releasing wire 41 is pulled to the link mechanism 30 side by the operation of the link mechanism 30. When the leg locking releasing mechanism is released, the seat cushion 11 becomes in a state of being rotatable in the front and rear direction.

For the locking claw 43, the rotating thereof is urged by an urging spring 45 to the direction such that the locking state to the leg striker 44 is maintained.

The third link member 33 is a substantially rectangular member, being disposed between the first link member 31 and the back plate 28, and the central part thereof is rotatably supported on the first link member 31 side by the second shaft part 33a.

To the lower end part side of the third link member 33, the cancel wire 42 is locked via a locking part 42c.

On the upper end part side, the cylindrical locking protrusion 35 serving as a locking mechanism is formed. This locking protrusion 35 is inserted through the arc-shaped elongated hole 31b formed in the first link member 31 and is in contact with the locking recess 32b of the second link member 32, so that the second link member 32 is locked to rotate together with the first link member 31. The locking protrusion 35 is formed to have an outside diameter slightly smaller than the width of the elongated hole 31b. On the other hand, the elongated hole 31b is formed in an arcuate shape to draw a circle concentric with the second shaft part 33a as described above. Therefore, the configuration is made such that the locking protrusion 35 moves along the elongated hole 31b with the rotating of the third link member 33.

The other end part side of the cancel wire 42 locked to the third link member 33 as the power transmitting member is explained below.

As shown in FIG. 8, the other end part side of the cancel wire 42 locked to the locking part 42c of the third link member 33 is guided by a cancel cable 42a and is connected to a locking rib 49 provided in the connecting part between the side frame 22a and the back frame support part 21a. The locking rib 49 is a member mounted to the reclining mechanism 27, and is mounted to rotate together with the side frame 22a.

That is to say, in this embodiment, the other end part of the cancel wire 42 is locked to the locking rib 49. The other end part side of the cancel wire 42 is configured so that the locking rib 49 pulls the locking part 42c formed in the third link member 33 via the cancel wire 42 in the state in which the seat back 12 is folded, and functions as a detecting element by rotating the third link member 33. That is to say, the reclining assembly has the reclining mechanism 27 and the detecting element.

In this embodiment, the locking rib 49 locked to the other end part side of the cancel wire 42 is formed on the reclining mechanism 27. However, any other locking part may be used as far as the configuration is made such that the cancel wire 42 is operated in the state in which the seat back 12 is folded over the seat cushion 11. Further, the locking rib 49 may be formed in a portion separate from the reclining mechanism 27. In this case, the reclining assembly is configured so that the reclining mechanism 27 and the detecting element are provided in separate portions.

In the state in which the third link member 33 is not rotating, the second link member 32 is locked to the first link member 31 by the locking protrusion 35, and can pull the leg releasing wire 41 by rotating with the rotating of the first link member 31.

When the third link member 33 is rotated, the locking protrusion 35 fixed to the third link member 33 moves along the elongated hole 31b. By the movement of the locking protrusion 35, the locking recess 32b is made to not be in contact with the locking protrusion 35. Therefore, the locking of rotating of the first link member 31 and the second link member 32 is released.

At this time, a state in which the second link member 32 does not rotate even if the first link member 31 is rotated by the operation of the strap 20 is formed, and the leg releasing wire 41 having been locked to the second link member 32 becomes in a state of being not pulled even if the first link member 31 rotates.

That is to say, in the state in which the seat back 12 is folded, the configuration is such that even if the strap 20 is pulled, the locking of the front leg 14 to the vehicle body floor 4 is not released. In other words, by rotating of the third link member 33, a state in which the second link member 32 cannot rotate can be formed.

On the locking releasing mechanism side (the other end part side of the link mechanism 30) to which the leg releasing wire 41 is connected, the urging spring 45 is provided to urge the leg releasing wire 41 to the direction of holding in the locked state. Therefore, in the state in which the passenger does not operate the strap 20, concerning the first link member 31 and the second link member 32 as well, the rotating of the link mechanism 30 is urged to the direction such that the strap 20 is pulled downward via the strap connecting member 34.

In this embodiment, the locking part 34a of the strap connecting member 34 provided on the first link member 31 pivotally supports the strap connecting member 34 on the first link member 31 to be rotatable, and also the other end side thereof is inserted through a guide hole part 28a formed in the back plate 28. The guide hole part 28a is formed in an arcuate shape to draw a part of a circle concentric with the first shaft part 31a, so that the locking part 34a can move in the guide hole part 28a with the operation of the first link member 31. Also, by adjusting the length of the guide hole part 28a, the upper and lower limits of rotating amount of the first link member 31 can be set.

End part members 40b and 41b serving as guide brackets, which are end parts on the link mechanism 30 side of the reclining releasing cable 40a and the leg releasing cable 41a for guiding the reclining releasing wire 40 and the leg releasing wire 41, respectively, are fixed onto the back plate 28 by locking members (not shown). An end part member 42b on the link mechanism 30 side of the cancel cable 42a for guiding the cancel wire 42 is fixed to the first link member 31 by a locking member (not shown).

The end part members 40b, 41b and 42b serving as guide brackets have only to be provided with a function of being engaged with the reclining releasing wire 40, the leg releasing wire 41, and the like to guide the reclining releasing wire 40, the leg releasing wire 41, and the like through the engagement portions. Therefore, the end part members 40b, 41b and 42b can also be formed as ring-shaped or claw-shaped members for guiding the cables.

Herein, the stowing/restoring operation of the seat S of this embodiment and the operation of the link mechanism 30 are explained with reference to FIGS. 10 to 13.

In FIGS. 10 to 13, explanation is given in the state in which the seat arrangement selector dial is set to the stowage mode.

First, the stowing operation of the seat S is explained with reference to FIGS. 10A to 10F.

Figure 10A:
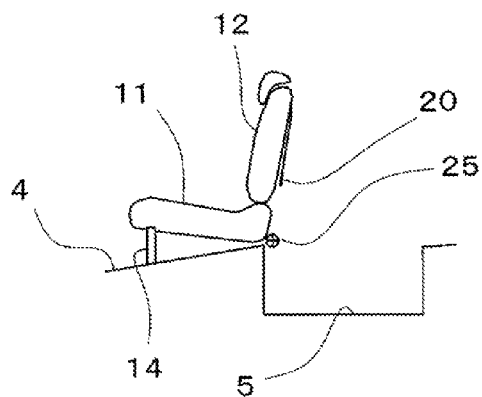
FIGS. 10A-10F are explanatory side views showing an operation procedure at the time of stowing operation of a vehicle seat in accordance with a first embodiment of the present invention.

FIG. 10A shows the state in which the seat S is set. The strap 20 is extended from the back surface side of the seat back 12.

Figure 10B:
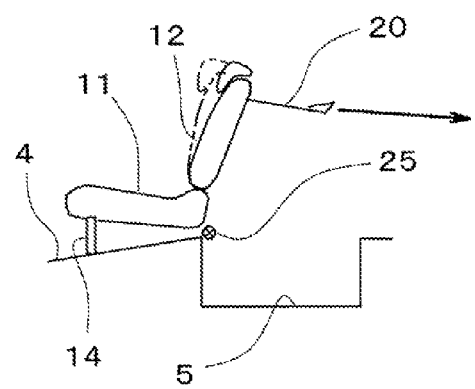

FIG. 10B shows the state in which the locking of the reclining mechanism 27 is released. When the passenger pulls the strap 20 to the rear, the locking of the reclining mechanism 27 is released.

At this time, the seat back 12 to which the strap 20 is mounted is being urged to the front direction by the urging spring (the spiral spring 48) mounted on the reclining mechanism 27. Since the configuration is made such that if the strap 20 is pulled against the urging direction, the locking of the locking claws 43 of the front leg 14 is released by a stress lower than the stress such as to fold the seat back 12 to the rear, the locking of the locking claws 43 is released.

Figure 10C:
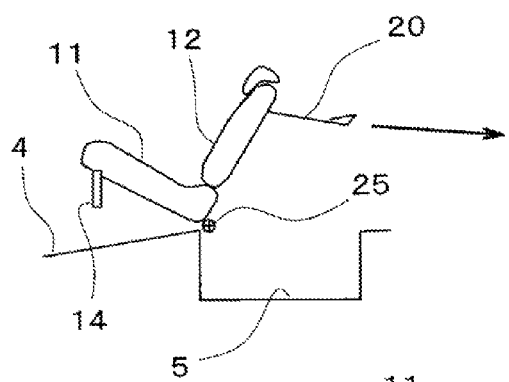

FIG. 10C shows the state in which the locking of the locking claws 43 of the front leg 14 has been released. The locking of the locking claws 43 of the front leg 14 is released, so that the seat S can be rotated to the rear.

Figure 10D:
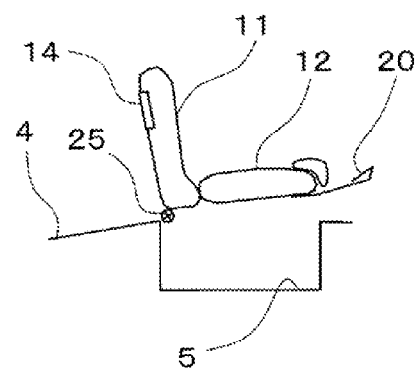
Figure 10E:
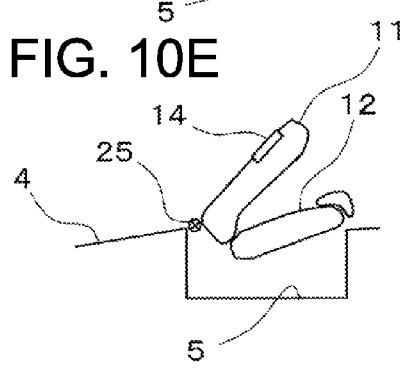

FIGS. 10D and 10E show the state in which the rearward rotating of the seat S is advanced. By pulling the strap 20 further, the seat S is rotated so that the center of gravity of the seat S goes beyond the middle point, and thereafter is rotated to the rear by its own weight, reaching a stowed state. At this time, the rearward rotating speed of the seat S is decreased by the urging spring 48 (the spiral spring 48) mounted on the seat support part 25, so that the shock caused by the stowage into the stowage recess 5 is buffered. Also, the front leg 14 is folded to the seat cushion 11 side by its own weight. The seat back 12 is also folded by the urging spring 45 mounted on the reclining mechanism 27, and is put on the seat cushion 11 in a folded manner.

Figure 10F:
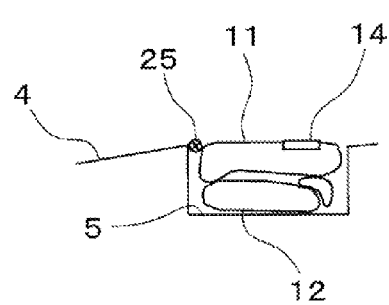

FIG. 10F shows the stowage state of the seat S. The opening part of the stowage recess 5 forms a flat surface integrally with the back surface of the seat cushion 11, so that a spacious cargo room is secured.

That is to say, merely by pulling the strap 20 to the rear by the passenger, the seat S in a set state can be stowed.

To keep the stowage state with more certainty, a locking mechanism for fixing the stowed seat S to the vehicle floor 4 of the stowage recess 5 may be provided.

The operation of the link mechanism at the time of the above-described stowing operation of the seat S is explained with reference to FIGS. 11A, 11B and 11C.

Figure 11A:
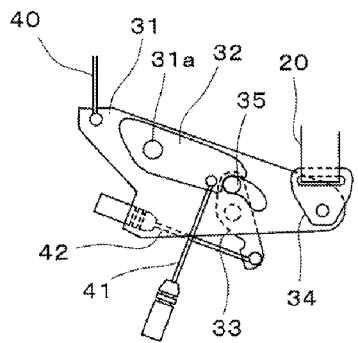
FIGS. 11A-11C are explanatory side views for explaining operation at the time of stowing operation of a link mechanism in accordance with a first embodiment of the present invention.

FIG. 11A shows the state of the link mechanism 30 at the time when the seat S is set (refer to FIG. 10A). This state is a state before the strap 20 is operated by the passenger. This state of the link mechanism 30 is referred to as the original position.

Figure 11B:
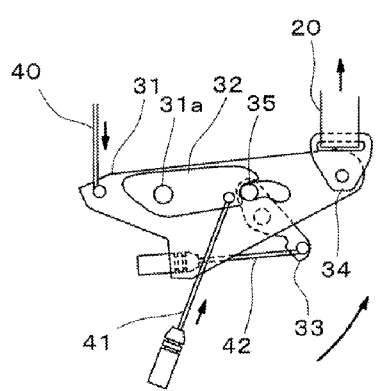

FIG. 11B shows the state of the link mechanism 30 at the time when the locking of the reclining mechanism 27 is released (see FIG. 10B). This state is a state in which the strap 20 is pulled slightly to the rear. By the operation of the strap 20, the first link member 31 is rotated in the direction of being pulled by the strap 20. Therefore, the reclining releasing wire 40 is pulled with the rotating, and the locking of the reclining mechanism 27 is released. At this time, the seat back 12 is in a state of being raised with respect to the seat cushion 11. Therefore, the cancel wire 42 is not pulled, and the second link member 32 rotates together with the first link member 31, whereby the leg releasing wire 41 is also pulled. However, setting is made so that the locking of the locking claws 43 for connecting the front leg 14 to the vehicle body floor 4 side is not released by the pulling amount in this state, so that the locking of the leg is kept.

Figure 11C:
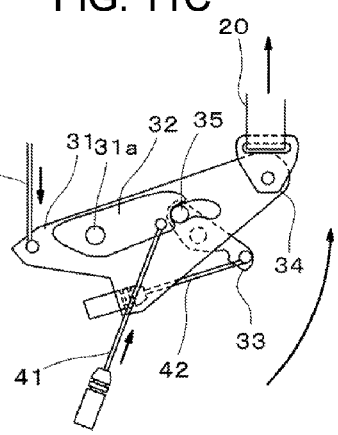

FIG. 11C shows the state of the link mechanism 30 at the time when the locking of the reclining mechanism 27 and the locking claws 43 of the front leg 14 has been released (see FIGS. 10C and 10D), showing the state in which the strap 20 is further pulled. Compared with the state shown in FIG. 11B (see FIG. 10B), the first link member 31 is also rotated greatly by strongly pulling the strap 20. With this rotating, the reclining releasing wire 40 and the leg releasing wire 41 are pulled further. At this time, the locking of the leg is released.

After the seat S has been stowed, when the operation of the strap 20 is stopped, the state shown in FIG. 11A is restored by the urging spring 45 mounted on the locking releasing mechanism side (the other end part side of the link mechanism 30) to which the reclining releasing wire 40 and the leg releasing wire 41 are connected. However, since the seat back 12 is stowed in a state of being folded over the seat cushion 11 (see FIGS. 10E and 10F), the cancel wire 42 is pulled, and the third link member 33 is still held in a state of being rotated.

Next, the restoring operation of the seat S is explained with reference to FIGS. 12A to 12E.

Figure 12A:
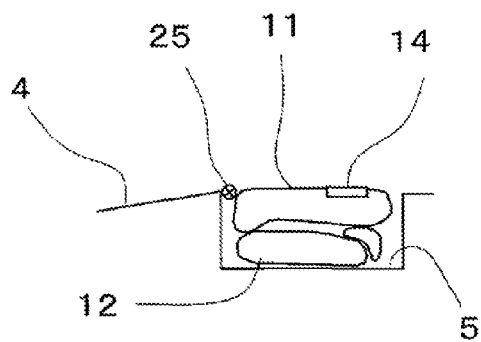
FIGS. 12A-12E are explanatory side views showing an operation procedure at the time of restoring operation of a vehicle seat in accordance with a first embodiment of the present invention.

FIG. 12A shows the state in which the seat S has been stowed. When the seat S is pulled out of the stowage recess 5, the seat S is rotated to the front around the rotating shaft 25a.

Figure 12B:
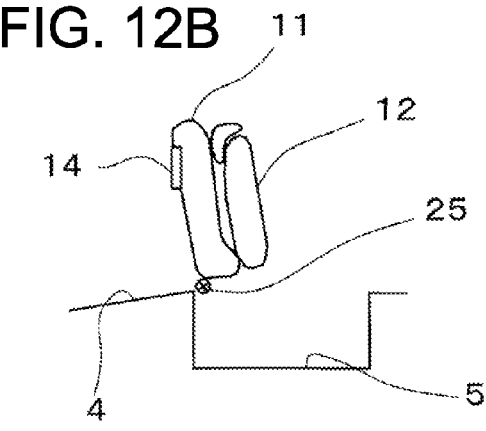

FIG. 12B shows the state at the time when the seat S is rotated to the front. With the forward rotating of the seat S, the front leg 14 is deployed to the front by its own weight.

Figure 12C:
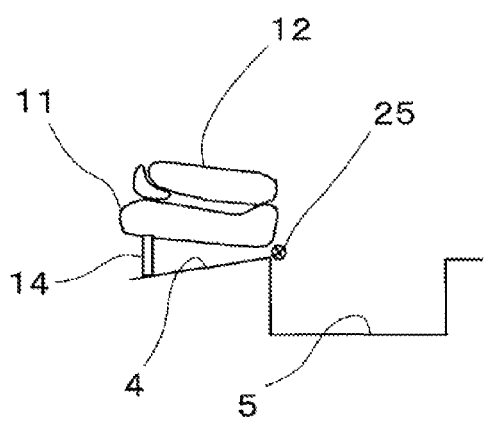

FIG. 12C shows the state in which the locking claws 43 of the front leg 14 of the seat S are locked to the vehicle body floor 4 side. The locking claws 43 are locked to the leg striker 44 on the vehicle body floor 4 side by pressing due to the own weight of the seat S. At this time, the seat back 12 is in a state of being folded.

Figure 12D:
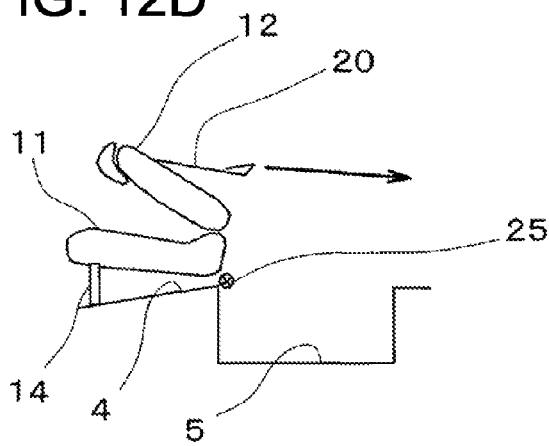

FIG. 12D shows the operation for pulling the strap 20 to the rear from the state in which the locking claws 43 of the front leg 14 of the seat S are locked to the vehicle body floor 4 side. At this time, the locking claws 43 are kept in a locked state, so that only the seat back 12 can be raised with respect to the seat cushion 11.

Figure 12E:
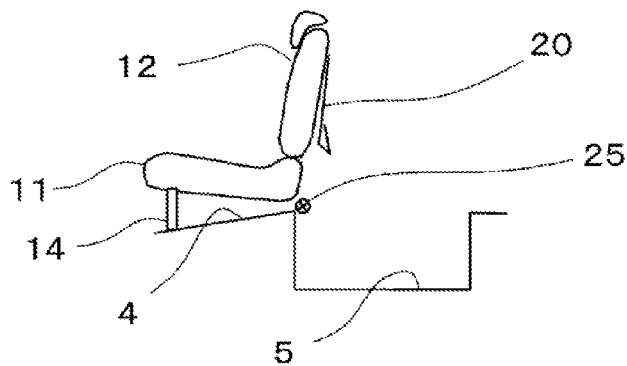

FIG. 12E shows the state in which the restoring operation of the seat S has been finished.

After the seat S in the stowage state in which the seat back 12 is folded has been rotated to the front, the seat S can be restored merely by pulling the strap 20 to the rear by the passenger.

The operation of the link mechanism 30 at the time of the above-described restoring operation of the seat S is explained with reference to FIGS. 13A, 13B and 13C.

Figure 13A:
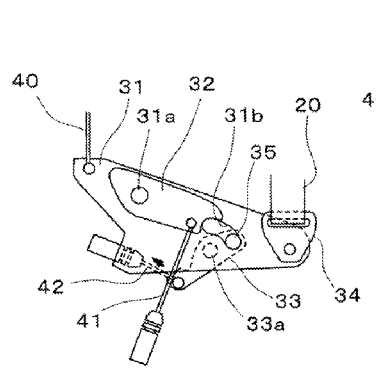
FIGS. 13A-13C are explanatory side views for explaining operation at the time of restoring operation of a link mechanism in accordance with a first embodiment of the present invention.

FIG. 13A shows the state of the link mechanism 30 at the stage at which the seat S is rotated from the stowage state of the seat S (see FIG. 12A) and the locking claws 43 are locked to the vehicle body floor 4 side (see FIG. 12C). This stage is a stage before the strap 20 is operated by the passenger. Since the operation is performed in the state in which the seat back 12 is folded, the state in which the cancel wire 42 is pulled and the third link member 33 is rotated is held.

Figure 13B:
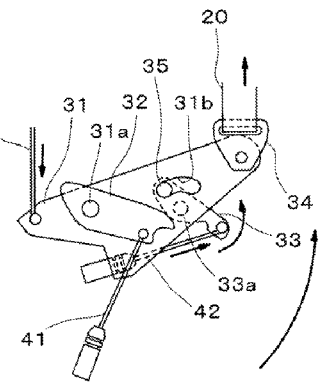

FIG. 13B shows the stage at which the strap 20 is pulled slightly to the rear to raise the seat back 12 (see FIG. 12D). By the operation of the strap 20, the first link member 31 is rotated. Therefore, the reclining releasing wire 40 is pulled, and thereby the locking of the reclining mechanism 27 is released, so that the seat back 12 can be rotated to the rear. At this time, since the locking protrusion 35 moves together with the third link member 33, even if the first link member 31 rotates, the second link member 32 is not locked and is in a state of being unable to rotate.

Also, with the raise of the seat back 12, the rotating amount of the third link member 33 decreases. However, the third link member 33 rotates exceeding the rotating range in which the locking protrusion 35 comes into contact with the second link member 32, so that the locking recess 32b of the second link member 32 is kept in a state of not being locked to the first link member 31. Therefore, the state in which the locking of the locking claws 43 for connecting the front leg 14 to the vehicle body floor 4 side is not released is held, so that the seat back 12 can be raised with respect to the seat cushion 11 merely by pulling the strap 20.

Figure 13C:
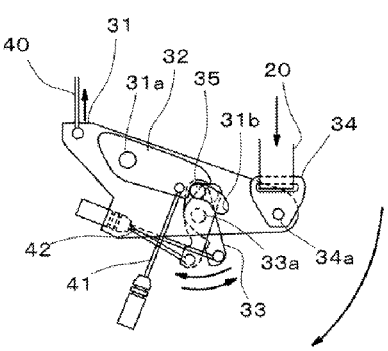

FIG. 13C shows the state in which the restoring operation of the seat S has been finished (see FIG. 12E). When the rearward pulling operation of the strap 20 is stopped, the position of the first link member 31 is also returned to the original position by the urging from the reclining releasing wire 40 and the leg releasing wire 41. At this time, since the seat back 12 is raised with respect to the seat cushion 11, the third link member 33 is in a state of not being pulled by the cancel wire 42. Therefore, even by a minute stress, the third link member 33 can be rotated. The second link member 32 is also returned to the original position again and is locked to the first link member 31, and the link members of the link mechanism 30 are restored to the state of original position.

Successively, the seat arranging operation to the open bench state of the seat S in accordance with this embodiment and the operation of the seat arrangement selective mechanism 50 are explained with reference to FIGS. 14 to 17.

First, the seat arrangement selective mechanism 50 is explained with reference to FIG. 14A.

The seat arrangement selective mechanism 50 has a function of forming slackness of the reclining releasing wire 40 by the movement of the end part member 40b to the link mechanism 30 side and changing over the state as appropriate to a state in which even if the reclining releasing wire 40 is pulled by the operation of the link mechanism 30, the pull amount is absorbed by the formed slackness, so that the locking of the reclining mechanism 27 cannot be released, and is formed on the back plate 28 above the link mechanism 30 as described above.

The seat arrangement selective mechanism 50 includes the selective dial 52 disposed on the back surface of the seat S, a disc 53 serving as a plate material that rotates in association with the selective dial 52, and a fourth link member 54 serving as a rotating member that is mounted with the end part member 40*b* of the reclining releasing cable 40*a*.

The selective dial 52 is a resin-made or metal-made dial that is disposed in a position in which the selective dial 52 can be operated directly by the passenger sitting on the back surface side of the seat S as shown in FIG. 3. By using the selective dial 52, a seat arrangement that is changeable by rotating operation can be selected. From two kinds of states of the stowage state and the open bench state of the seat S, a seat arrangement that can be changed by the operation of the selective dial 52 as appropriate can be selected.

The disc 53, which is a circular plate material disposed on the back plate 28, is configured to turn in association with the rotating operation of the selective dial 52. In this embodiment, the selective dial 52 and the disc 53 are disposed coaxially. However, an interlocking mechanism using a gear or a belt therebetween may be provided. Also, a substantially rectangular recess 53*a* is formed to extend from the center side of the disc 53 to the radial direction. In this embodiment, the recess 53*a* is formed in a depressed shape. However, the recess 53*a* may be replaced with a penetrating elongated hole.

The fourth link member 54 is a substantially rectangular member disposed on the front side of the disc 53, and one end part thereof is rotatably supported on the back plate 28 by a third shaft part 54*a*. To the other end part side thereof, the end part member 40*b* on the link mechanism 30 side of the reclining releasing cable 40*a* is fixed by a locking member (not shown). On the back side of the fourth link member 54, a substantially cylindrical protrusion 55 that is inserted in the recess 53*a* is formed. The recess 53*a* is formed in a substantially rectangular shape linearly from the center of the disc 53 to the circumferential direction as described above, and on the other hand, the protrusion 55 is formed to have an outside diameter smaller than the width of the recess 53*a*, so that the protrusion 55 can move on the inside of the recess 53*a*.

Next, the operation of the seat arrangement selective mechanism 50 is explained with reference to FIGS. 14 and 15.

Figure 14A:
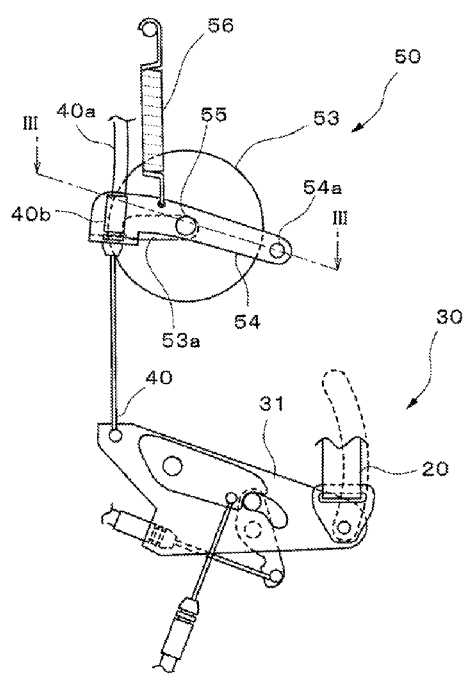
FIGS. 14A, 14B are explanatory side views for explaining operation in a stowage mode of a seat arrangement selective mechanism in accordance with a first embodiment of the present invention.
Figure 14B:
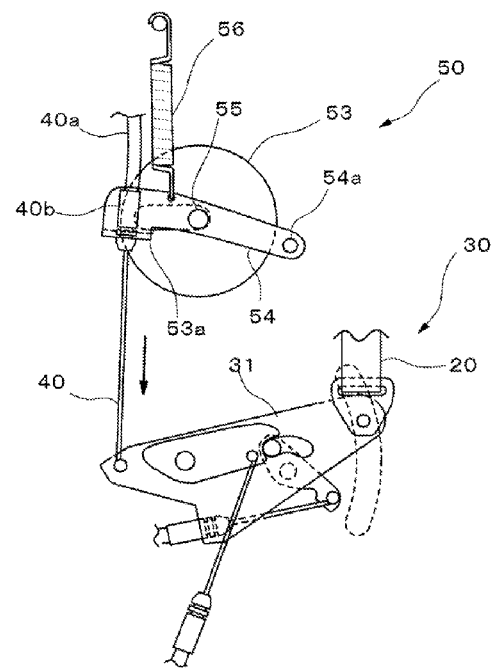

First, FIGS. 14A and 14B show the stowage mode (setting for stowage), showing a state in which the locking of the reclining mechanism 27 can be released. In this state, the selective dial 52 on the back surface of the seat S is set to the seat stowing/restoring operation. When the strap 20 is pulled in this state, with the operation of the link mechanism 30, the locking of the reclining mechanism 27 is released. Therefore, the seat back 12 can be folded over the seat cushion 11, so that the stowing operation of the seat S can be performed.

The operation of the seat arrangement selective mechanism 50 at this time is explained.

As described above, the one end part side of the fourth link member 54 is rotatably supported on the back plate 28, and to the other end part side thereof, the end part member 40*b* on the link mechanism 30 side of the reclining releasing cable 40*a* is fixed. Further, an urging spring 56 for urging the fourth link member 54 to the upside (the side of separating from the link member 30) is mounted. Also, the protrusion 55 is formed almost in the middle of the fourth link member 54, and the protrusion 55 is inserted in the recess 53*a* formed in the disc 53.

The recess 53*a* in the stowage mode (setting for stowage) is arranged from the center of the disc 53 to the transverse direction (the side of separating from the third shaft part 54*a*). The protrusion 55 is locked to the side surface portion of the recess 53*a*, and therefore cannot move to the lower part side.

At this time, the reclining releasing wire 40 is guided by the reclining releasing cable 40*a*, and on the other hand, the pull stroke of the reclining releasing wire 40 is determined by the operation of the first link member 31 of the link mechanism 30.

The arrangement of the reclining releasing cable 40*a* can be determined by changing the arrangement of the end part member 40*b*. By moving the end part member 40*b* to the link mechanism 30 side by the length of pull stroke from the link mechanism 30, the pulling operation of the reclining releasing wire 40 can be disabled.

Specifically, when the end part member 40*b* is brought close to the link mechanism 30, the distance of the route of the reclining releasing cable 40*a* connecting the link mechanism 30 to the reclining mechanism 27 can be shortened. On the other hand, for the reclining releasing wire 40 inserted through the reclining releasing cable 40*a*, too, the length necessary for the transmission of the operating force is shortened, but the positions of locked both end parts are unchanged so that an excess of the reclining releasing wire 40 occurs.

With the pulling operation performed by the rotating (pulling) of the first link member 31, the end part member 40*b* is brought close to the link mechanism 30 and the excess of the reclining releasing wire 40 is produced, whereby the arrangement can be made such that the pull stroke caused by the operation of the link mechanism 30 is absorbed, and the operating force cannot be transmitted to the other end side.

Even in the case where the entire pull stroke cannot be absorbed by the movement of the end part member 40*b* only, to release the locking of the reclining mechanism 27, some degree of pulling amount (operation stroke) is necessary. Therefore, by adjusting so that a pulling amount of a length not exceeding this operation stroke is transmitted to the reclining mechanism 27 side, an effect equivalent to the above can be achieved.

The end part member 40 is fixed to the other end part side of the fourth link member 54 (an end member mounting part 54*b*) by a locking member (not shown), so that the position of the end part member 40*b* can be moved by the rotating of the fourth link member 54.

In the stowage mode, since the protrusion 55 is locked into the recess 53*a* arranged horizontally, the fourth link member 54 cannot rotate to the lower side, and the end part member 40*b* is locked in a position separate from the link mechanism 30. Therefore, when the first link member 31 is rotated by the operation of the link mechanism 30 as shown in FIG. 14B, the reclining releasing wire 40 accordingly transmits the pull stroke to the reclining mechanism 30 side, so that the locking of the reclining mechanism 27 is released.

In this case, a seat arrangement in which the seat S shown in FIG. 10 is stowed by the operation of the strap 20 can be provided.

Figure 15A:
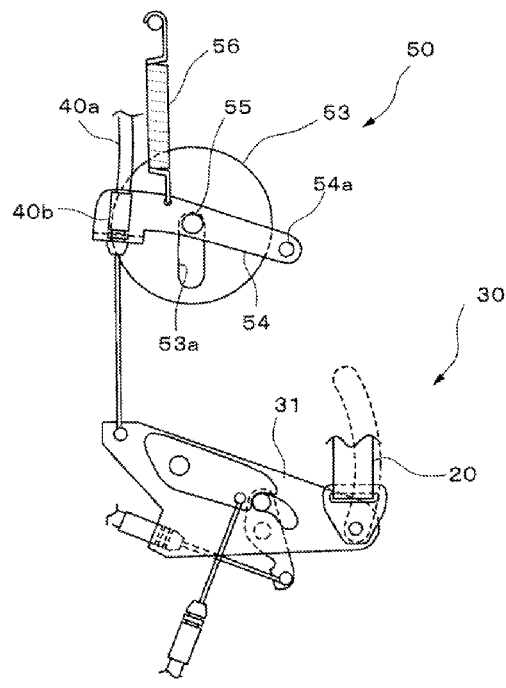
FIGS. 15A, 15B are explanatory side views for explaining operation in an open bench mode of a seat arrangement selective mechanism in accordance with a first embodiment of the present invention.
Figure 15B:
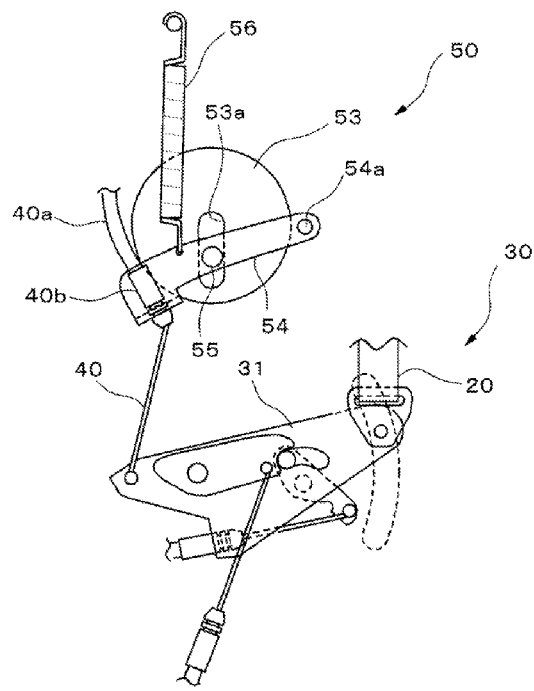
Figure 16:
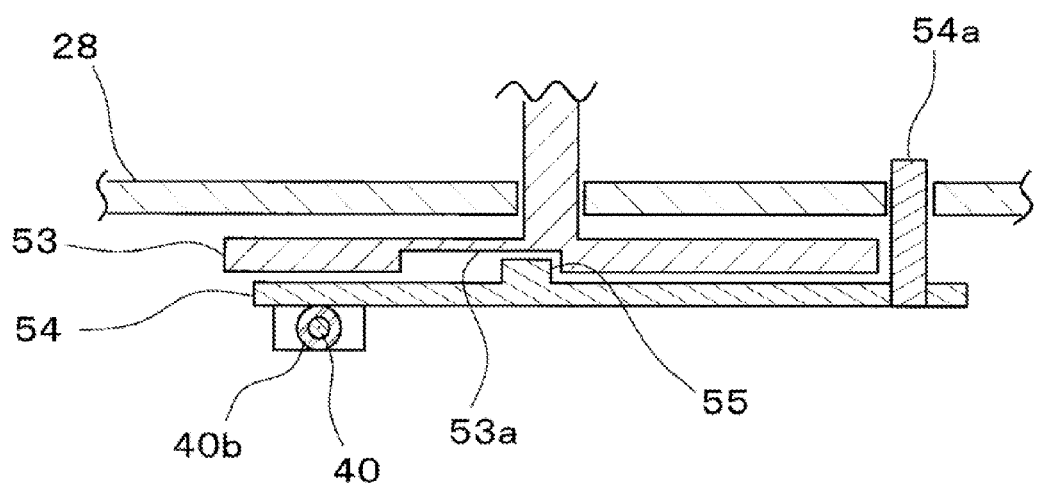
FIG. 16 is a sectional explanatory view of a seat arrangement selective mechanism in accordance with a first embodiment of the present invention, the view being taken along the line III-III of FIG. 14A.

FIGS. 15A and 15B show the state of the seat arrangement selective mechanism 50 that is arrangeable to an open bench (open bench mode), showing the state in which the locking of the reclining mechanism 27 cannot be released. In this case, the selective dial 52 on the back surface of the seat S is in a state of being rotated to be set to the open bench mode. When the strap 20 is pulled in this state, with the operation of the link mechanism 30, the operation of the seat S becomes enabled while the locking of the reclining mechanism 27 is not released, so that a seat arrangement in which the seat S is in an open bench state can be provided.

The operation of the seat arrangement selective mechanism 50 at this time is explained.

Since the state is changed over to the open change mode (a state in which the seat arrangement can be made an open bench) by the rotating operation of the selective dial 52, the disc 53 also rotates in association with the rotation of the selective dial 52. With the rotation of the disc 53, the position of the recess 53a is arranged from the center of the disc 53 to the downside.

In the above-described state in which the recess 53a is arranged on the lower side, the protrusion 55 can move to the lower side along the recess 53a, so that the fourth link member 54 can rotate to the lower side around the third shaft part 54a. However, since the fourth link member 54 is urged to the upside (the direction of separating from the link mechanism 30) by the urging spring 56, the fourth link member 54 is arranged on the upper side unless it is subjected to pulling operation from the link mechanism 30.

As shown in FIG. 15B, when the first link member 31 is rotated by the operation of the link mechanism 30, to pull the reclining releasing wire 40, the fourth link member 54 rotates against the urging of the urging spring 56. Therefore, the end part member 40b disposed on the fourth link member 54 moves to the link mechanism 30 side by the length of pull stroke, so that the pulling operation is not transmitted to the other end part side of the reclining releasing wire 40, and the locking of the reclining mechanism 27 is not released.

FIGS. 17A-17E are explanatory side views showing an operation procedure to an open bench of the seat S. The selective dial 52 is set to the open bench mode. The operation of the strap 20 shown in FIGS. 17A to 17D is the same as the operation shown in FIGS. 10A to 10D.

Figure 17A:
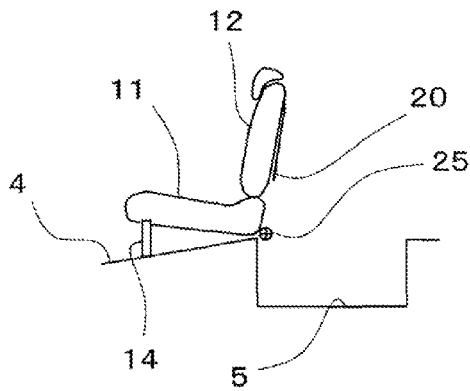
FIGS. 17A-17E are explanatory side views showing an operation procedure to an open bench of a seat in accordance with a first embodiment of the present invention.
Figure 17B:
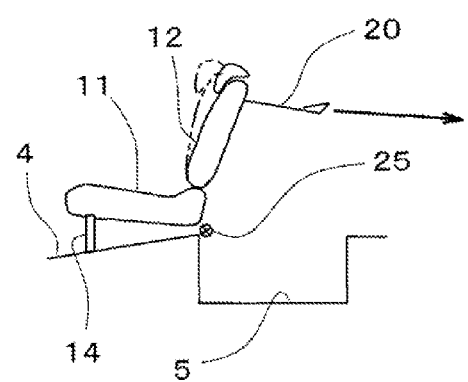
Figure 17C:
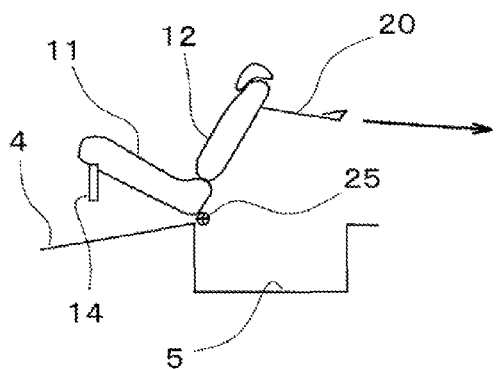
Figure 17D:
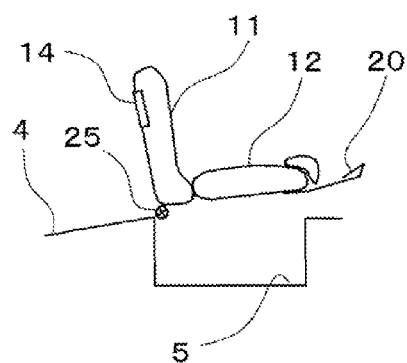
Figure 17E:
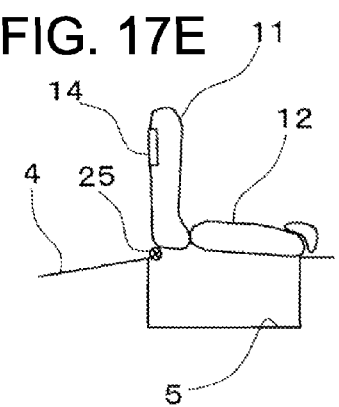

However, as shown in FIG. 17E, when the seat S is further rotated to the rear, since the locking of the reclining mechanism 27 has not been released in the open bench mode, the back surface of the seat back 12 comes into contact with the rear edge part of the stowage recess 5 and is locked thereto, so that an open bench seat is formed.

In this embodiment, the recess 53a in the stowage mode (setting for stowage) is arranged horizontally. However, the configuration may be such that the recess 53a is arranged vertically on the upper side of the disc 53. In this case, to prevent the fourth link member 54 from being rotated upward by the urging element 56, the configuration can be made such that a stopper that comes into contact with the side part in the rotating direction of the fourth link mechanism 54 is provided.

In this embodiment, the disc 53 is of a circular shape. However, the disc 53 may be of a polygonal shape. Also, the members constituting the link mechanism 30 and the seat arrangement selective mechanism 50, which constitute an embodiment of the present invention, may be formed of not only a steel material but also a nonferrous metal, a resin, or the like.

Second Embodiment

Figure 18A:
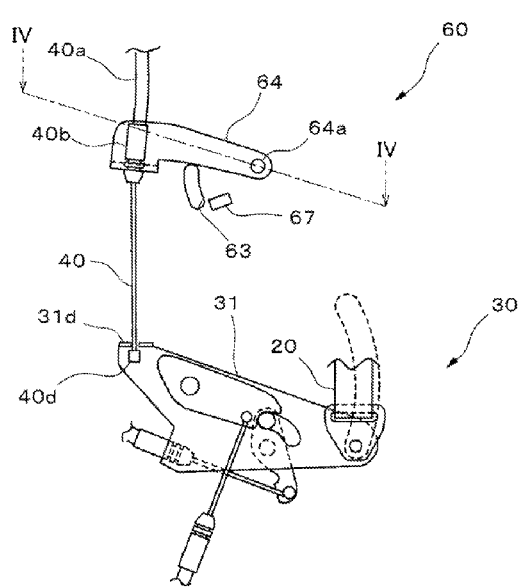
FIGS. 18A, 18B are explanatory side views for explaining operation in a stowage mode of a seat arrangement selective mechanism in accordance with a second embodiment of the present invention.
Figure 18B:
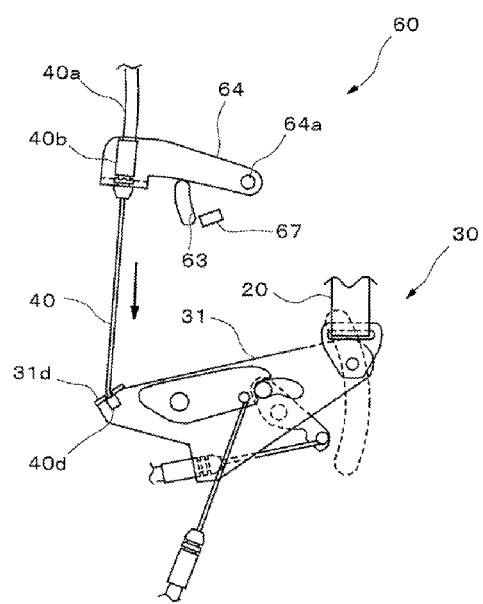
Figure 19A:
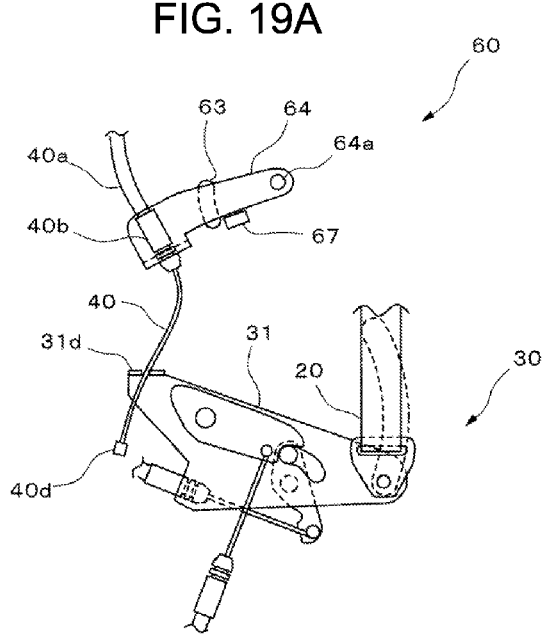
FIGS. 19A, 19B are explanatory side views for explaining operation in an open bench mode of a seat arrangement selective mechanism in accordance with a second embodiment of the present invention.
Figure 19B:
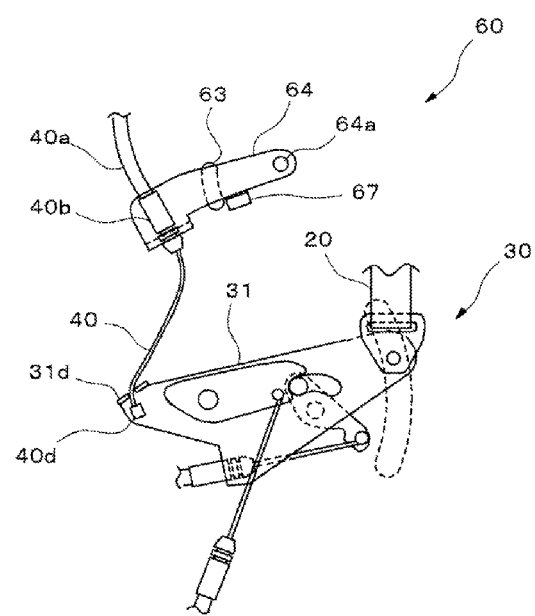
Figure 20:
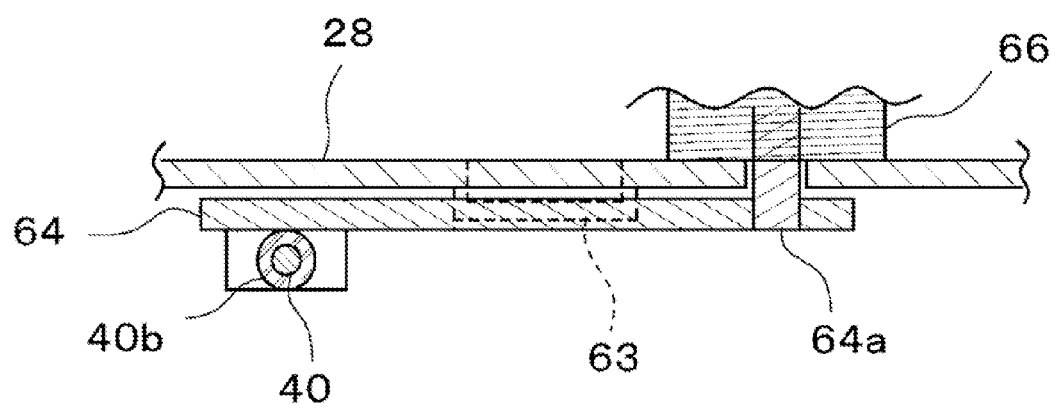
FIG. 20 is a sectional explanatory view of a seat arrangement selective mechanism in accordance with a second embodiment of the present invention, the view being taken along the line IV-IV of FIG. 18A.

FIGS. 18 to 20 show a second embodiment of the present invention. FIGS. 18A, 18B are explanatory side views for explaining operation in the stowage mode of a seat arrangement selective mechanism 60, FIGS. 19A, 19B are explanatory side views for explaining operation in the open bench mode of the seat arrangement selective mechanism 60, and FIG. 20 is a sectional explanatory view of the seat arrangement selective mechanism 60, the view being taken along the line IV-IV of FIG. 18A.

In the embodiment described below, the same symbols are applied to members, arrangements, and the like that are the same as those in the first embodiment, and the detailed explanation thereof is omitted.

FIGS. 18A, 18B are explanatory views for explaining operation in the stowage mode of the seat arrangement selective mechanism 60. The seat arrangement selective mechanism 60 of this embodiment includes a selective dial 62 disposed on the back surface of the seat S, a fourth link member 64 that is operated in association with the selective dial 62 and is mounted with the end part member 40b of the reclining releasing cable 40a, and a coil spring 66 for urging the fourth link member 64 to the back plate 28 side. Also, the back plate 28 is formed with a stopper emboss 63 for locking the rotating of the fourth link member 64 by way of convex embossing.

The seat arrangement selective mechanism 60 of this embodiment is configured so that the fourth link member 64 is interlocked with the turning of the selective dial 62, and the coil spring 66 urges the fourth link member 64 to the back plate 28 side (the rear side) to press the fourth link member 64 on the back plate 28 side. Also, the fourth link member 64 comes into contact with the upper end part of the stopper emboss 63 to lock the rotating to the lower side (the side of approaching the link mechanism 30).

In this embodiment, a wire stopper 40d is mounted in the end part on the link mechanism 30 side of the reclining releasing wire 40 to form a free end. On the other hand, on the link member 31, an end locking part 31d through which the reclining releasing wire 40 is inserted is formed. The end locking part 31d is formed with a slit having a diameter that is larger than the wire diameter of the reclining releasing wire 40 and is smaller than the diameter of the wire stopper 40d, and the reclining releasing wire 40 is inserted through the slit.

In order to rotate the selective dial 62, the selective dial 62 is operated by being pushedly turned against the urging of the coil spring 66.

FIGS. 18A and 18B show the state in which the selective dial 62 has been set to the stowage mode. In this state, the fourth link member 64 comes into contact with the upper end part of the stopper emboss 63 and is locked thereto, and thereby is made in a state that cannot be rotated to the link mechanism 30 side. That is to say, the end part member 40b is in a state of being locked to a location separate from the link mechanism 30. Therefore, when the link mechanism 30 rotates, the wire stopper 40d is locked to the end locking part 31d, and the reclining releasing wire 40 is pulled, whereby the reclining mechanism 27 is released.

FIGS. 19A and 19B show the state in which the selective dial 62 has been set to the open bench mode. In this state, the lower side surface of the fourth link member 64 comes into contact with a stopper 67, whereby the end part member 40b is locked in a position close to the link mechanism 30. At this time, a state in which the reclining releasing wire 40 is inserted through the end locking part 31d, and an excess wire projects to the lower side of the link member 31 is formed. Even if the link mechanism 30 operates and the first link member 31 rotates in this state, the end locking part 31d cannot lock the wire stopper 40d, and runs on idle in the excess portion of the reclining releasing wire 40. That is to say, the operating force from the strap 20 is not transmitted to the reclining mechanism 27, and the locking of the reclining mechanism 27 is not released.

The stopper emboss 63 in accordance with this embodiment is a convex part formed by pressing a part of the back plate 28. However, the stopper emboss 63 may be configured by disposing a convex member on the back plate 28. Also, the stopper 67 may be disposed not only on the lower side but also on the upper side to set the upper and lower limits of the rotating of the fourth link member 64.

Further, the configuration may be such that rugged parts are formed on the back side of the fourth link member 64, and on the other hand, irregularities are formed on the back plate 28 side, whereby the two elements are meshed with each other in the stowage mode position and in the open bench mode position.

Third Embodiment

Figure 21A:
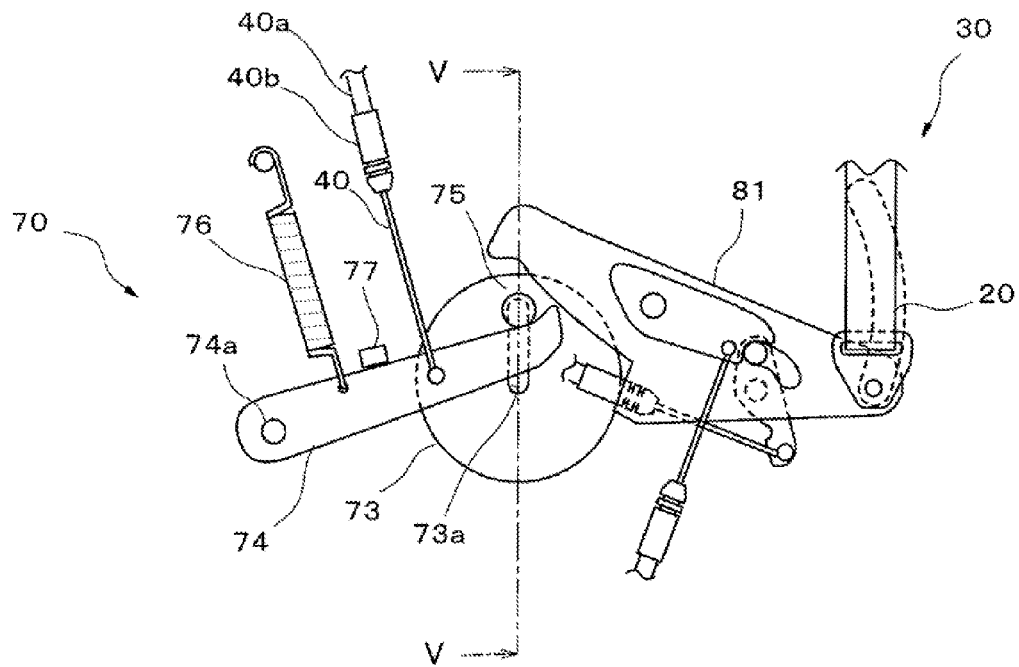
FIGS. 21A, 21B are explanatory side views for explaining operation in a stowage mode of a seat arrangement selective mechanism in accordance with a third embodiment of the present invention.
Figure 21B:
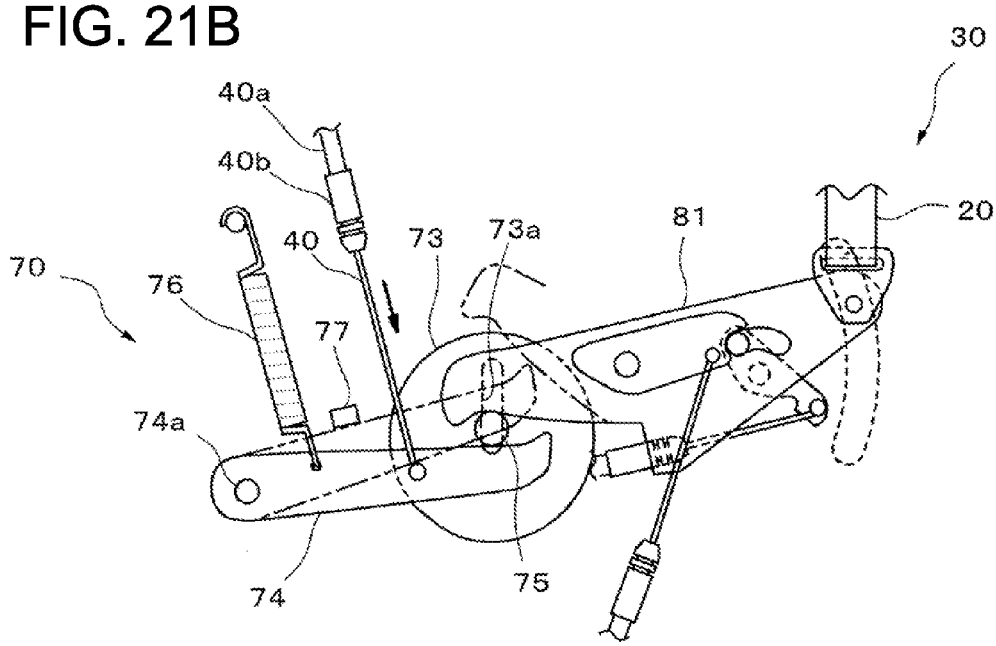
Figure 22A:
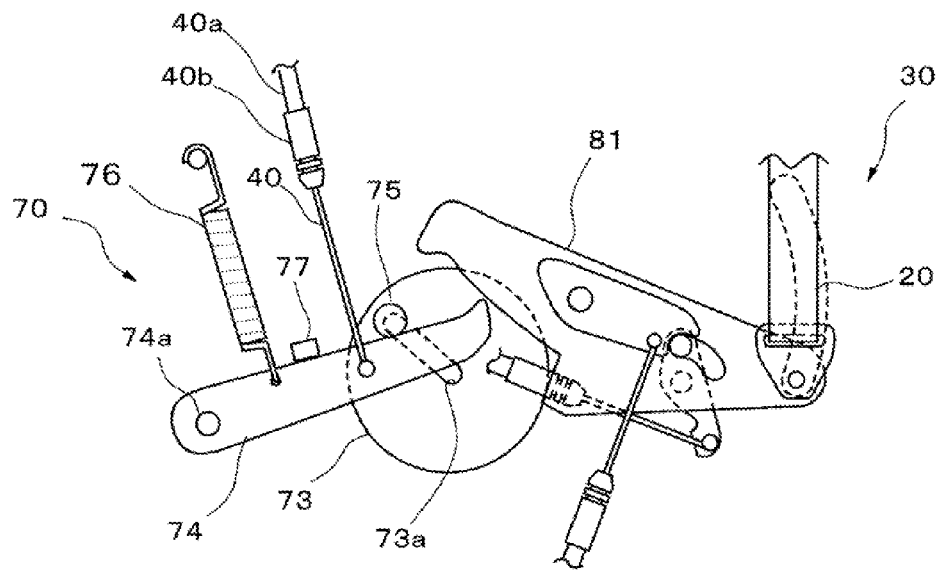
FIGS. 22A, 22B are explanatory side views for explaining operation in an open bench mode of a seat arrangement selective mechanism in accordance with a third embodiment of the present invention.
Figure 22B:
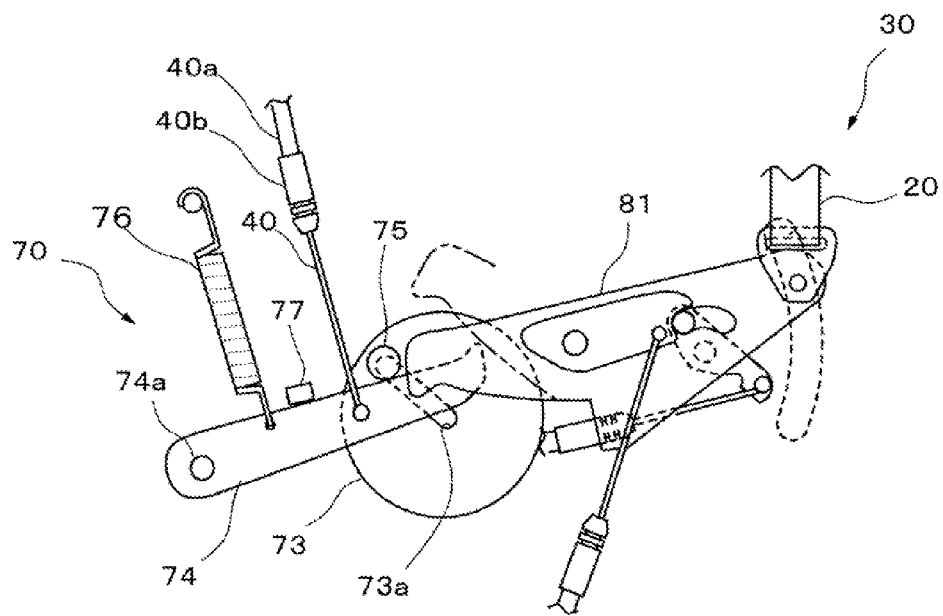
Figure 23:
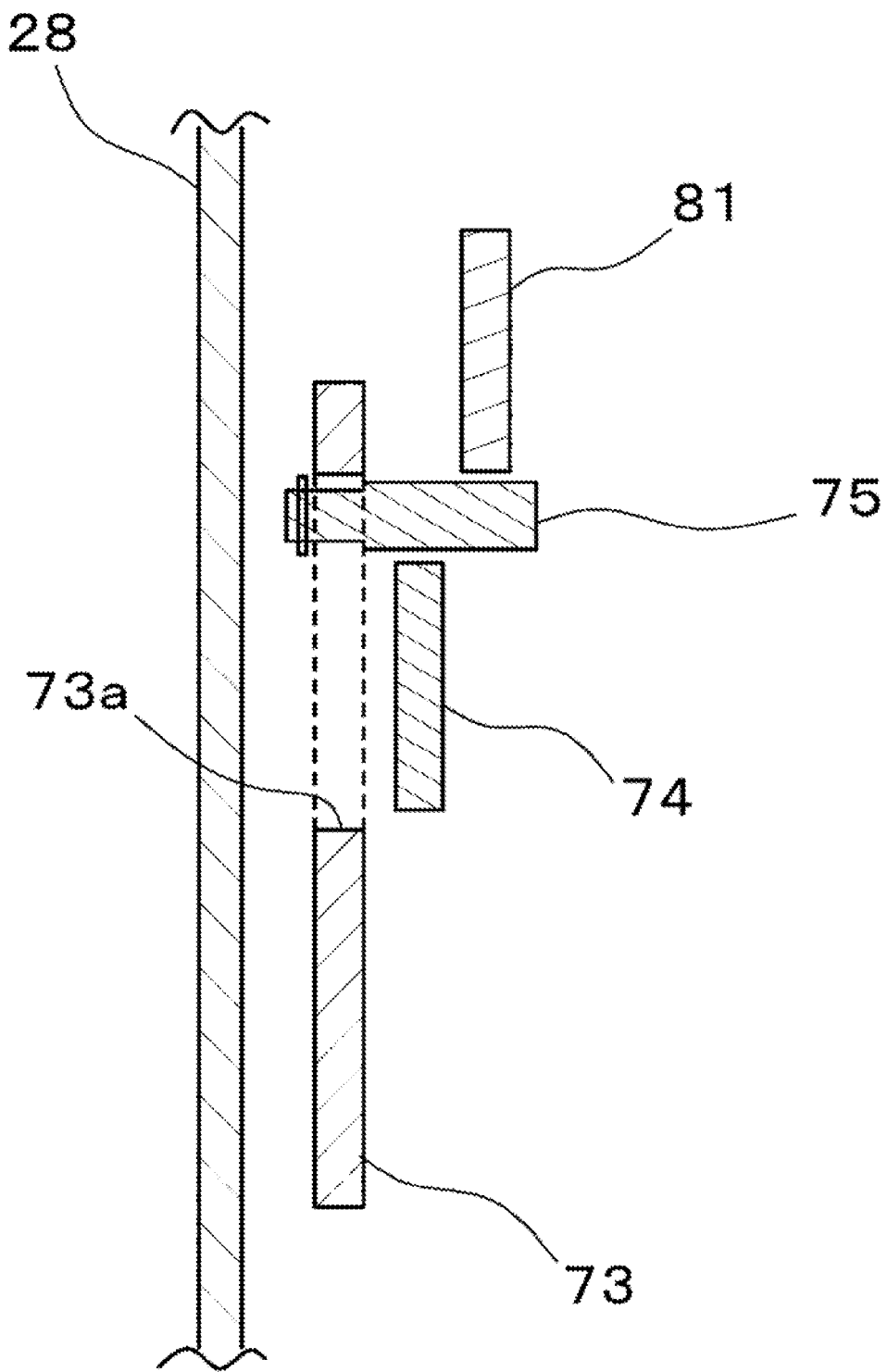
FIG. 23 is a sectional explanatory view of a seat arrangement selective mechanism in accordance with a third embodiment of the present invention, the view being taken along the line V-V of FIG. 21A.

FIGS. 21 to 23 show a third embodiment of the present invention. FIGS. 21A, 21B are explanatory side views for explaining operation in the stowage mode of a seat arrangement selective mechanism 70, FIGS. 22A, 22B are explanatory side views for explaining operation in the open bench mode of the seat arrangement selective mechanism 70, and FIG. 23 is a sectional explanatory view of the seat arrangement selective mechanism 70, the view being taken along the line V-V of FIG. 21A.

In the embodiment described below, the same symbols are applied to members, arrangements, and the like that are the same as those in the first embodiment, and the detailed explanation thereof is omitted.

FIGS. 21A, 21B are explanatory views for explaining operation in the stowage mode of the seat arrangement selective mechanism 70. The seat arrangement selective mechanism 70 of this embodiment includes a selective dial 72 disposed on the back surface of the seat S, a disc 73 serving as a plate material that rotates in association with the selective dial 72, and a fourth link member 74 mounted with the end part member 40b of the reclining releasing cable 40a. On the fourth link member 74, an urging spring 76 for urging the fourth link member 74 to the upward rotating direction (the direction reverse to the rotating direction in the pulling of the strap for a first link member 81) and a stopper 77 for setting the upper limit of the upward rotating are disposed.

The disc 73 is formed with an elongated hole 73a, and in this elongated hole 73a, a substantially cylindrical pin 75 mounted to be movable along the elongated hole 73a is fitted.

The fourth link member 74 is a substantially rectangular member one end part side of which is rotatably supported on the back plate 28 by a third shaft part 74a, and in intermediate portions thereof, one end part sides of the reclining releasing wire 40 and the urging spring 76 are locked. Also, the other end part of the fourth link member 74 is disposed so that the upper part side thereof can come into contact with the side part of the pin 75.

In this embodiment, the end part member 40b on the link mechanism 30 side of the reclining releasing cable 40a and the other end part side of the urging spring 76 are fixed onto the back plate 28 by a locking member (not shown). Also, the elongated hole 73a is formed as a penetrating hole; however, it may be formed as a concave-shaped recess.

The first link member 81, which is a member constituting the link mechanism 30, has a function that is the same as that of the first link member 31 in accordance with the first embodiment of the present invention, but is not fixed directly to the reclining releasing wire 40. The first link member 81 is disposed so that the lower face on the end part side thereof can come into contact with the side part of the pin 75.

As shown in FIG. 23, the fourth link member 74 is disposed on the back plate 28 side of the first link member 81, and is also disposed in such a manner that the height from the back plate 28 is changed to prevent the direct contact of the fourth link member 74 with the first link member 81. However, the pin 75 is arrangeable in a position of being in contact with both of the fourth link member 74 and the first link member 81.

FIGS. 21A and 21B show the state in which the selective dial 72 has been set to the stowage mode. In this state, the pin 75 is arranged between the first link member 81 and the fourth link member 74 by the rotation of the disc 73.

The first link member 81 is rotatably supported by the first shaft part 31a, the strap 20 is connected to one end part side of the first link member 81 via the strap connecting member 34, and the first link member 81 is rotated by the operation of the strap 20, whereby the other end part side of the first link member 81 is rotated to the lower side. This rotating of the first link member 81 can depress the pin 75 to the lower side.

One end part side of the fourth link member 74 is rotatably supported on the back plate 28, and the pin 75 is arranged above the other end part side of the fourth link member 74. Therefore, by the downward movement of the pin 75, the fourth link member 74 is pressed and rotated by the pin 75. That is to say, the configuration is made such that the first link member 81 rotates the fourth link member 74 via the pin 75, whereby the reclining releasing wire 40 mounted to the fourth link member 74 is pulled downward. The reclining releasing wire 40 is pulled to release the locking of the reclining mechanism 27. Therefore, the seat back 12 is folded, so that the seat S is stowed.

FIGS. 22A and 22B show the state in which the selective dial 72 has been set to the open bench mode. In this state, the pin 75 is arranged, by the rotation of the disc 73, out of the range in which the pin 75 is depressed by the rotating of the first link member 81.

Even if the first link member 81 is rotated by the operation of the strap 20, the first link member 81 cannot depress the pin 75 to the lower side. The fourth link member 74 is not pressed by the pin 75 and does not rotate, so that the reclining releasing wire 40 mounted to the fourth link member 74 is also not pulled. Therefore, the locking of the reclining mechanism 27 is not released, and the raised state of the seat back 12 is maintained, so that the seat arrangement in the open bench state can be provided.

In this embodiment, the pin 75 is fitted to be movable freely in the elongated hole. However, to prevent play, an urging element for urging the pin 75 to the upper side may be provided. Also, as the stopper 77, a rectangular member is used; however, a cylindrical member may be used. Alternatively, the pin 75 can be provided with the function of the stopper 77. Further, the urging spring 76 can be formed as a torsion spring mounted to the third shaft part 74a.

In the above-described first to third embodiments of the present invention, the seat S using the strap 20 as the stowing/restoring operation assembly has been explained. However, the present invention can also be applied, in the same way, to a seat using an operating element other than the strap 20 or a seat using an operating element or operating mechanism in which the strap 20 and a lever or the like are combined in plural numbers.

According to the vehicle seat in accordance with various embodiments of the present invention, in addition to the conventional stowage/restoration state as the seat arrangement, the seat arrangement can also be changed to the open bench state. The addition of seat arrangement can improve the commodity quality.

Also, by the operation of the selective dial, the change of seat arrangement to either of the stowage state and the open bench state can be selected. That is to say, by selecting the seat arrangement mode by way of the selective dial in the state in which the seat is set, the stowage state or the open bench state can be formed by the pulling operation of the strap 20, so that high operability can be assured.

The third-row vehicle seat divided into the right and left has been explained as a specific example. However, the seat type is not limited to this type. Needless to say, the same configuration can be applied to a long bench type seat formed integrally, a passenger seat adjoining the driver's seat, and any other rear seat.

TABLE OF REFERENCE CHARACTERS

S seat
F seat frame
S1 right seat
S2 left seat
4 vehicle body floor
5 stowage recess
11 seat cushion
12 seat back
13 headrest
14 front leg
20 strap
20a strap outlet part
21 seat cushion frame
21a back frame support part
22 seat back frame
22a side frame
22b central frame
23 pillar support part
24 front leg frame
25 seat support part
25a rotating shaft
25b rotating shaft bracket
27 reclining mechanism
28 back plate
28a guide hole part
30 link mechanism
31, 81 first link member
31a first shaft part
31b, 73a elongated hole
31d end locking part
32 second link member
32b locking recess
33 third link member
33a second shaft part
34 strap connecting member
34a, 40c, 41c, locking part
42c
35 locking protrusion
40 reclining releasing wire
40a reclining releasing cable
40b, 41b, 42b end part member
40d wire stopper
41 leg releasing wire
41a leg releasing cable
42 cancel wire
42a cancel cable
43 locking claw
43a locking claw rotating shaft
44 leg striker
45, 56, 76 urging spring
48 spiral spring
49 locking rib
50, 60, 70 seat arrangement selective mechanism
52, 62, 72 selective dial
53, 73 disc
53a recess
54, 64, 74 fourth link member
54a, 64a, 74a third shaft part
54b, 64b end member mounting part
55 protrusion
63 stopper emboss
66 coil spring
67, 77 stopper
75 pin

The invention claimed is:

1. A vehicle seat having two patterns of a fall-down state and an open bench state as a seat arrangement, comprising:
a first seat support for rotatably supporting one end part side of a seat cushion;
a reclining assembly;
a seat back that is foldable over the seat cushion via the reclining assembly;
a second seat support provided on an other end part side of the seat cushion;
an engaging and disengaging assembly that engages and disengages the second seat support with and from a vehicle body floor side;
a link mechanism connected to at least the reclining assembly;
an operating element that operates at least one of the reclining assembly and the engaging and disengaging assembly via the link mechanism; and
a selective assembly for enabling or disabling the operation of the reclining assembly when the operating element is activated.

2. The vehicle seat according to claim 1, wherein:
the selective assembly comprises a rotating member, one end part side of which is rotatably supported and to the other end part side of which is fixed a guide bracket for guiding a transmitting member connected to the link mechanism and the reclining assembly, a plate material formed with substantially rectangular recess, and a selective member that operates the plate material;
the rotating member has a protrusion on the plate material side; and
the protrusion is fitted to be movable in the recess.

3. The vehicle seat according to claim 1, wherein:
the selective assembly comprises a rotating member, one end part side of which is rotatably supported and to the other end part side of which is fixed a guide bracket for guiding a transmitting member connected to the link mechanism and the reclining assembly, a selective member that operates the rotating member, and an urging element for urging the rotating member to the base plate side on which the rotating member is supported.

4. The vehicle seat according to claim 3, wherein protrusion is provided on the rotating member side of the base plate or on the base plate side of the rotating member.

5. The vehicle seat according to claim 1, wherein:
the selective assembly comprises a rotating member, one end part side of which is rotatably supported and to which is locked a transmitting member connected to the reclining assembly, a plate material formed with an elongated hole, and a selective member that operates plate material;
the link mechanism comprises a link member, which is rotated by the pulling of the operating element and is disposed in a position of being not in contact with the rotating member; and
the selective assembly further has a projecting member, which is fitted to be movable in the elongated hole, and is capable of coming into contact with both of the link member and the rotating member.

* * * * *

UNITED STATES PATENT AND TRADEMARK OFFICE
CERTIFICATE OF CORRECTION

PATENT NO. : 8,141,930 B2
APPLICATION NO. : 12/682074
DATED : March 27, 2012
INVENTOR(S) : Tatsuo Sayama It is certified that error appears in the above-identified patent and that said Letters Patent is hereby corrected as shown below:

IN THE CLAIMS:

Column 20, lines 48-49, replace "wherein protrusion is provided" with -- wherein a protrusion is provided --

Column 20, lines 56-57, replace "a selective member that operates plate material" with -- a selective member that operates the plate material --

Signed and Sealed this
Ninth Day of April, 2013

Teresa Stanek Rea
*Acting Director of the United States Patent and Trademark Office*